US009620970B2

(12) United States Patent
Gadh et al.

(10) Patent No.: US 9,620,970 B2
(45) Date of Patent: Apr. 11, 2017

(54) NETWORK BASED MANAGEMENT FOR MULTIPLEXED ELECTRIC VEHICLE CHARGING

(71) Applicant: THE REGENTS OF THE UNIVERSITY OF CALIFORNIA, Oakland, CA (US)

(72) Inventors: Rajit Gadh, Los Angeles, CA (US); Ching Yen Chung, New Taipei (TW); Li Qui, Los Angeles, CA (US); Chi-Cheng Chu, Laguna Beach, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 1033 days.

(21) Appl. No.: 13/691,709

(22) Filed: Nov. 30, 2012

(65) Prior Publication Data

US 2013/0154561 A1 Jun. 20, 2013

Related U.S. Application Data

(60) Provisional application No. 61/565,501, filed on Nov. 30, 2011.

(51) Int. Cl.
*H02J 7/00* (2006.01)
*H02J 1/14* (2006.01)
(Continued)

(52) U.S. Cl.
CPC ......... *H02J 7/0027* (2013.01); *B60L 11/1816* (2013.01); *H02J 1/14* (2013.01);
(Continued)

(58) Field of Classification Search
USPC ........................................... 320/109
See application file for complete search history.

(56) References Cited

U.S. PATENT DOCUMENTS 5,548,200 A * 8/1996 Nor ...................... B60L 11/184
320/106
7,256,516 B2 * 8/2007 Buchanan ........... B60L 11/1811
307/62
(Continued)

FOREIGN PATENT DOCUMENTS

WO 2005008808 A2 1/2005
WO 2008073476 A2 6/2008
(Continued)

OTHER PUBLICATIONS

Plug in America, "Guidebook for Commercial Electric Vehicle Charging Station Installations," May 2012, pp. 1-47.
(Continued)

*Primary Examiner* — Yalkew Fantu
(74) *Attorney, Agent, or Firm* — O'Banion & Ritchey LLP; John P. O'Banion

(57) ABSTRACT

A system for multiplexing charging of electric vehicles, comprising a server coupled to a plurality of charging control modules over a network. Each of said charging modules being connected to a voltage source such that each charging control module is configured to regulate distribution of voltage from the voltage source to an electric vehicle coupled to the charging control module. Data collection and control software is provided on the server for identifying a plurality of electric vehicles coupled to the plurality of charging control modules and selectively distributing charging of the plurality of charging control modules to multiplex distribution of voltage to the plurality of electric vehicles.

29 Claims, 18 Drawing Sheets

(51) Int. Cl.
*H02J 13/00* (2006.01)
*B60L 11/18* (2006.01)

(52) U.S. Cl.
CPC ........ *H02J 7/0073* (2013.01); *H02J 13/0075* (2013.01); *H02J 13/0086* (2013.01); *B60L 2240/70* (2013.01); *Y02T 10/7005* (2013.01); *Y02T 10/7055* (2013.01); *Y02T 10/7072* (2013.01); *Y02T 10/7291* (2013.01); *Y02T 10/92* (2013.01); *Y02T 90/14* (2013.01); *Y02T 90/16* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | |
|---|---|---|
| 8,106,627 B1 | 1/2012 | Rossi |
| 2002/0070705 A1 | 6/2002 | Buchanan et al. |
| 2005/0110460 A1* | 5/2005 | Arai ................ B60L 3/0046 320/116 |
| 2009/0222143 A1 | 9/2009 | Kempton |
| 2009/0229900 A1 | 9/2009 | Hafner et al. |
| 2009/0251300 A1 | 10/2009 | Yasuda et al. |
| 2009/0259603 A1 | 10/2009 | Housh et al. |
| 2009/0261779 A1* | 10/2009 | Zyren ................ G06Q 50/06 320/109 |
| 2009/0313033 A1 | 12/2009 | Hafner et al. |
| 2009/0313103 A1 | 12/2009 | Ambrosio et al. |
| 2010/0017249 A1 | 1/2010 | Fincham et al. |
| 2010/0211643 A1 | 8/2010 | Lowenthal et al. |
| 2011/0106329 A1 | 5/2011 | Donnelly et al. |
| 2011/0201112 A1 | 5/2011 | Basham et al. |
| 2011/0172839 A1 | 7/2011 | Brown et al. |
| 2013/0307466 A1* | 11/2013 | Frisch ................ B60L 11/1844 320/106 |

FOREIGN PATENT DOCUMENTS

| | | |
|---|---|---|
| WO | 2011037322 A2 | 3/2011 |
| WO | 2011102857 A1 | 8/2011 |

OTHER PUBLICATIONS

Porter, et al. "Energy Efficient Battery Charger System Test Procedure," Nov. 12, 2008, pp. 1-32.
County of Sonoma Department of General Services, "Electric Vehicles Charging Station Program and Installation Guidelines," Jul. 2011, pp. 1-65.
ChargePoint Inc., "CT2020 Family ChargePoint Networked Charging Stations," Product description, 2013, pp. 1-4.
ECOtality, Inc. "ECOtality Expands Product Offering; Announces New Minit Charger 12," Product Description, Jan. 22, 2013.
AeroVironment "Electric Vehicle Charging Station Configurations, Practical Multi-port charging for commercial parking facilities, model EVSE-RS single, dual and quad," Product Description, 2011.
Schneider Electric Canada, Inc. "EVlink, Electric vehicle charging solutions" Calalogue, Apr. 2014.
Grand Valley Automation, Inc. "Electric Car Charging Solutions," Product Description, Webpage, 2012.
Charge Net Electric Vehicle Charging Stations, Product Description, Webpage, 2012 http://www.evchargeamerica.com/products_ev2001.html.
Aker Wade Power Technologies, Emax Hf, Product History, website, http://www.akerwade.com/index.php?option=com_content&view=article&id=25&Itemid=23, date unknown, retrieved on Nov. 17, 2014.
Aker Wade Power Technologies, Level III Fast Charging Stations for Electric Vehicles, Product Description, date unknown, p. 1.
Korean Intellectual Property Office, International Search Report and Written Opinion (pp. 1-9) issued on Feb. 17, 2012 for related International Patent Application No. PCT US2011/040077 with claims searched (pp. 10-16) pp. 1-16.
Clark Hochgraf et al, "Smart Grid Charger for Electric Vehicles Using Existing Cellular Networks and SMS Text Messages," Smart Grid Communications, 2010 First IEEE International Conference, Oct. 4-6, 2010, pp. 167-172.
Kevin Mets et al., "Optimizing Smart Energy Control Strategies for Plug-In Hybrid Electric Vehicle Charging," Network Operations and Management Symposium Workshops (NOMS Wksps), 2010 IEEE/IFIP, Apr. 19-23, 2010, pp. 293-299.
Lankton, "Smart grid technologies and the development of a decision making framework for market entry," Thesis (M.B.A.)—Massachusetts Institute of Technology, Sloan School of Management; and, (S.M.)—Massachusetts Institute of Technology, Engineering Systems Division; in conjunction with the Leaders for Global Operations Program at MIT, 2010, pp. 1-85.
Critical Software, "Electric Vehicle Charging Stations Network Management System," Brochure, http://www.cars21.com/web/assets/link/Brochure-csNMS.pdf, retrieved on Mar. 26, 2013, pp. 1-2.
General Electric, "Wattstation Connect," Product Information, 2012, http://www.geindustrial.com/cwc/Dispatcher?REQUEST=PRODUCTS&pnlid=8&famid=9404&catid=6061&id=EV-WattStCon, retrieved on Mar. 26, 2013, pp. 1-2.
Ferreira et al., "Electric Vehicle Route Recommender System," 1st International Conference on Smart Grids and Green IT Systems, Apr. 19-20, 2012, Porto, Portugal, pp. 1-10.
Brooks, A. and Gage, T., "Integration of Electric Drive Vehicles With the Electric Power Grid—a New Value Stream," EVS 18 Berlin, 2001, pp. 1-15.
Circutor, Sa, "Electric Vehicle Smart Charge," Brochure, http://circutor.com/docs/Ca_V_03.pdf, retrieved on Mar. 26, 2013, pp. 1-27.
Siemens, Corp., "Siemens community multi-level electric vehicle charging solutions," product description, 2010, pp. 1-2.

\* cited by examiner

NETWORK BASED MANAGEMENT FOR MULTIPLEXED ELECTRIC VEHICLE CHARGING

STATEMENT REGARDING FEDERALLY SPONSORED RESEARCH OR DEVELOPMENT

This invention was made with Government support of Grant No. DE-OE0000192, awarded by the United States Department of Energy (DOE). The Government has certain rights in this invention.

CROSS-REFERENCE TO RELATED APPLICATIONS

This application is a non-provisional of U.S. provisional patent application Ser. No. 61/565,501 filed on Nov. 30, 2011, incorporated herein by reference in its entirety.

This application is related to PCT international application No. PCT/US2011/040077 filed on Jun. 10, 2011, and published on Dec. 15, 2011 as PCT International Publication No. WO 2011/156776 A2, incorporated herein by reference in its entirety.

INCORPORATION-BY-REFERENCE OF MATERIAL SUBMITTED ON A COMPACT DISC

Appendix A referenced herein is a computer program listing in a text file entitled "UC_2012_224_2_LA_source_code_listing.txt" created on Nov. 30, 2012 and having a 462 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to electric vehicle (EV) charging, and more particularly to a networked infrastructure for electric vehicle charging.

2. Description of Related Art

The current charging infrastructure technology includes the following drawbacks: a) existing networks are proprietary and hardware is linked closely to proprietary software, b) some networks are not I.P. based, and c) existing networks become expensive when going from one to many, because their configuration is such that economies of scale do not apply.

Accordingly, an object of the present invention is an improved charging infrastructure for controlling charging of EV's.

BRIEF SUMMARY OF THE INVENTION

The present invention is directed to solving the above existing problems with current charging of EV's by using smart charging algorithms and multiplexing, along with cloud/I.P.-based networking.

The present invention includes an infrastructure for smart multiplexing and monitoring for charging EVs. The systems and methods of the present invention create a centralized and hierarchical control system that connects with the various EV charging end nodes (e.g. charging stations and end users, through the Internet. The architecture allows for intermediate gateways and devices such as zigbee, Wifi and 3G/4G devices to exist between the server and the end device that performs the monitoring and control. The monitoring/charging device can store information at the edge until the central server requests it. The control may originate on the server such that the actuation/switching element only follows the command from the server.

The system of the present invention uses I.P.-based networking to monitor EVs, send information to the cloud, and execute control signals based on various inputs. At the edge of the network, the multiplexer enables multiple vehicles to be charged from a single outlet, thereby reducing the requirement of multiple chargers. This also helps create scalable solution that is economical by having several outlets to one power input, with the software program performing smart scheduling of the charging function. The hardware layer is separated from the software layer using standards for communications and interfaces.

The architecture of the present invention may be configured such that communication is over secure sockets layer (SSL), with users having roles with different assigned privileges with respect to the user's ability to monitor, control or edit the system. Different cities/areas may also have different privileges to monitor, control or edit the city or area's gateways, stations or basic information. Charging may be controlled automatically or manually. The system is configured such that a gateway's charging algorithm may be changed readily on-the-fly when needed. Up scalability is available for gateways, algorithms, users, cities, parking lots, etc.

In one embodiment, station status and power info maybe displayed in geographic map form, e.g. using Google Maps, or like application. A web-based application may also be included for users to access the system via any mobile device which can access internet.

The system may include reporting functionality such as a visualization and report generator, email or text notification of the charging when it is closed. The system allows for dynamically available charging stations, with corresponding information for each city, parking lot, etc. in hierarchical tables for real-time monitoring and control.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
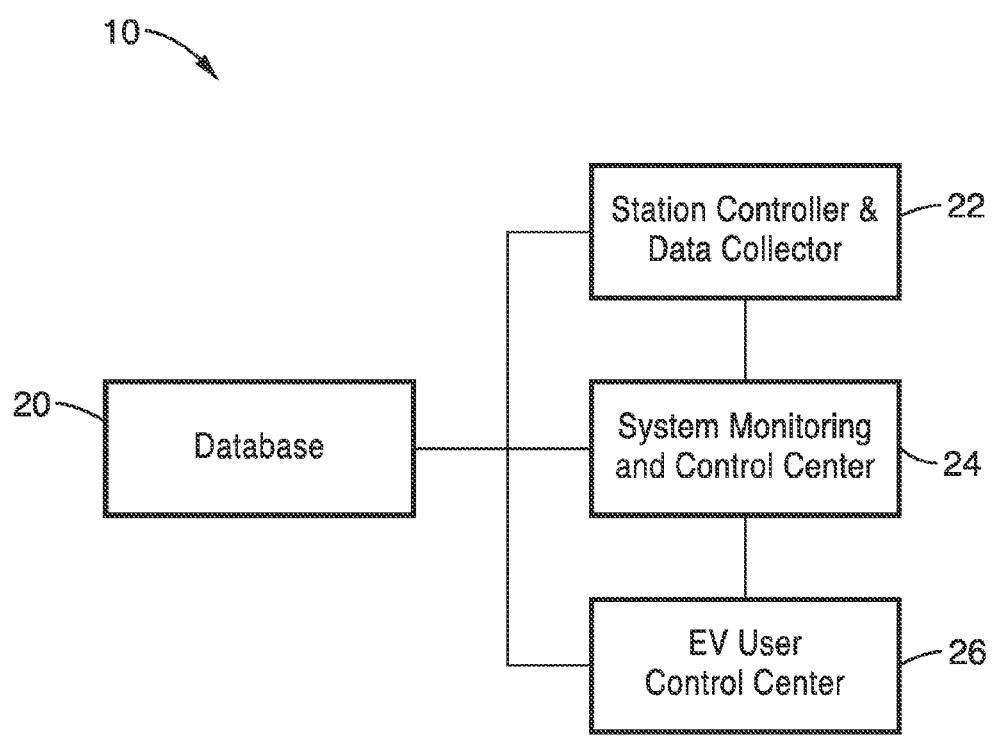
FIG. 1 is a schematic diagram of an EV station and user monitoring and control system of the present invention.

Referring to FIG. 1, electric vehicle (EV) station and user monitoring and control system 10 generally comprises four primary components: 1) database 20, 2) data collector/station controller 22, 3) system monitoring and control center 24, and 4) EV user control center 26.

Figure 2:
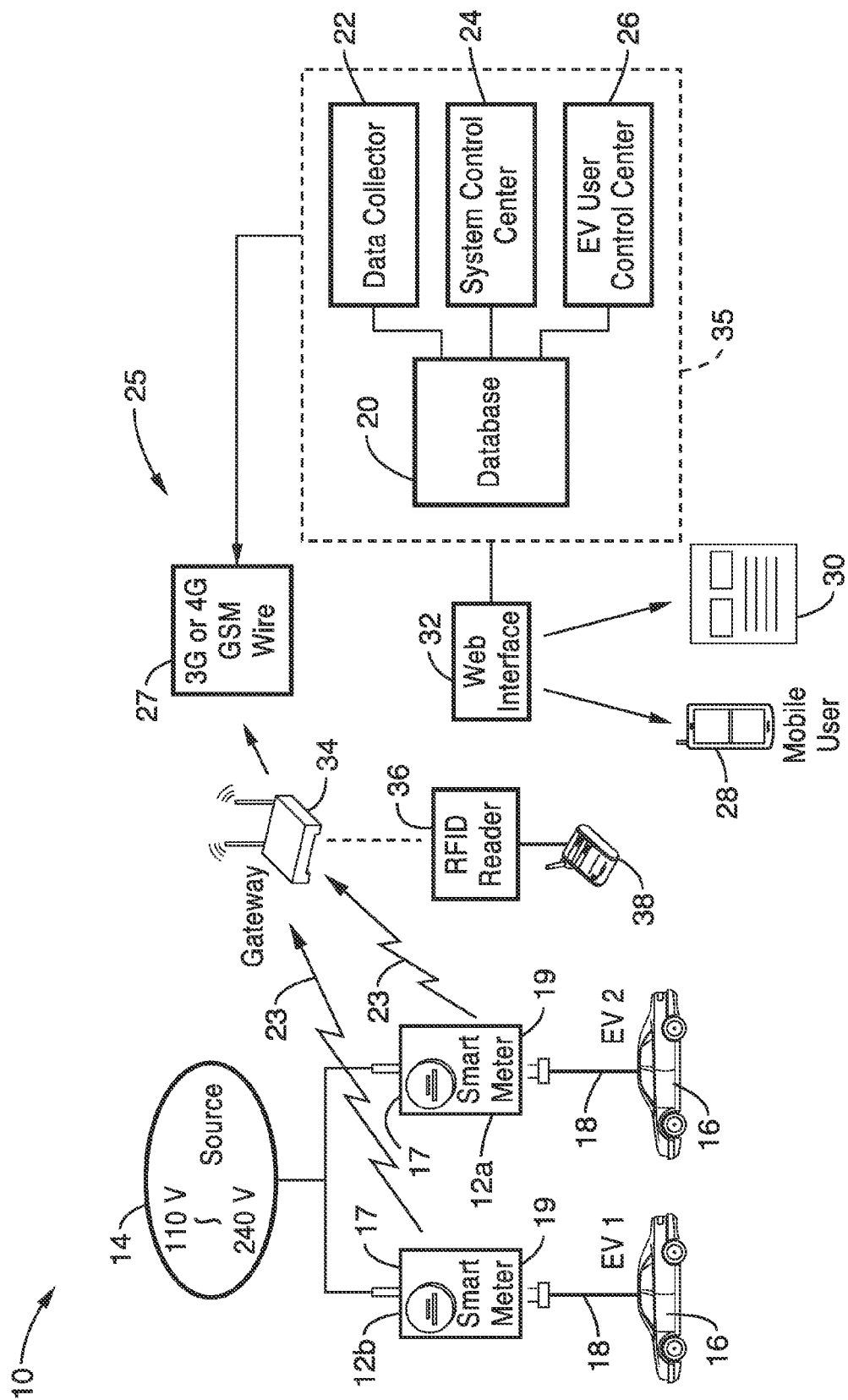
FIG. 2 shows a schematic diagram of the network architecture for the EV station and user monitoring and control system shown in FIG. 1.

FIG. 2 shows a schematic diagram of the charging network architecture 25 for the EV station and user monitoring and control system 10. The components of the monitoring and control system 10 may be integrated within a server 35 having processor (not shown) configured for executing application software associated with each of the components. Alternatively, system 10 may be upscaled to a server cluster (not shown) of designated servers for the database 20 (which may also be segregated into station a database server, and user database server), data collector/station controller 22, monitoring and control center 24, and user control center 26. Each server may also be clustered, if needed.

The monitoring and control center 24 as well as user control center 26 can be accessed via a web interface 32 through wireless network 27 (shown in a preferred configuration as wireless 3G or 4G network).

On the charging side of the charging network 25, the power source, or electric outlet 14 (e.g. a 110 volt outlet), which feeds power at input side 17 into a plurality of multiplexed smart meters 12a-12b, which are modules that allow for sensing and control of charging and are configured to couple to one or more EV's 16 via charging cord 18 at charging side 19.

Figure 3:
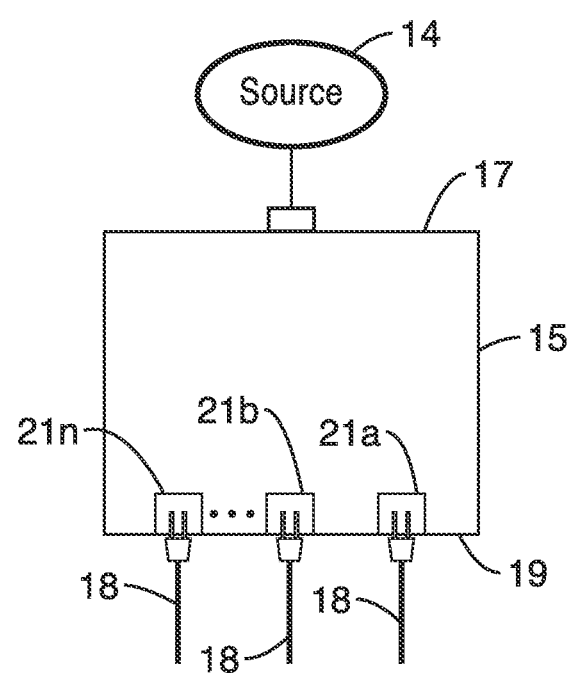
FIG. 3 illustrates a multiplexing charging meter in accordance with the present invention.

FIG. 3 illustrates configuration wherein multiple meters are incorporated into a singular multiplexing control box or module 15, which is configured to receive 110 volt on the input side 17, but on the output side 19 there are multiple outlets (outlets 21a, 21b . . . 21n) that connect to 110 volt charging cords 18 to feed into the electric vehicle 16. It is appreciated that on the outlet side 19, any number, e.g. preferably between 1 and 8 vehicles 16, can be connected.

Multiplexing meter or control box 15 has the capability to receive both 110-volt in and out as well as 220-volt both for the in and out voltages at a time. Multiplexing control box 15 may be used by one vehicle 16 at a time, or by connecting into both the slots 21a and 21b, one can also connect to two vehicles at the same time, even if there is only a single outlet to connect the two vehicles.

As result, with the multiplexer control box 15 in combination of the control software of the present invention, one can turn on and off the different outlets and allow for scheduling intelligently based on schedule of the driver, status of the grid, the available power, energy pricing with respect to time of day/week, etc.

Multiplexing control box 15 or meters 12a-12b are configured with sensors (not shown) to allow them to sense current, voltage, frequency and power quality monitoring for each dedicated power line 18 coupled to the site. The measurements taken by control box 15 or meters 12a-12b are then sent by way of wireless transceivers 23 (e.g. Zigbee or any wireless or wire line communications) onto a gateway 34. The gateway 34 then forwards this data by way of the local networks using local wireless networks such as Wifi, Zigbee, or wide-area networks. Robustness may be increased by having a memory within the gateway 34 in case the communications link stops functioning.

From the gateway 34, data from meters 12a/b, 15 may be forwarded in real-time or substantially real-time, depending on the delay of the network, through the Internet via wireless connection 27 (e.g. 3G or 4G) to control server 35. A web application user interface 32 may be used that allows for access and/or control of the system via a mobile device (e.g. cell phone 28) or a desktop computer 30.

Control signals from server 35 may also sent using the same pathway over wireless connection 27. For example, when a command to turn off a particular station or charger 18 is sent by way of the website interface 32, the instruction may be sent by way of the cloud through the gateway 34 into the meter 12/15. The connection between the gateway 34 and the cloud can be by way of Ethernet, Wifi, wide-area network or any other standard IP based network.

Optionally, an RFID reader 36 may be coupled to the gateway 34 for reading RFID badge 38 worn by a user in accordance with charging protocols described in further detail below with respect to FIGS. 13 and 14.

Figure 4:
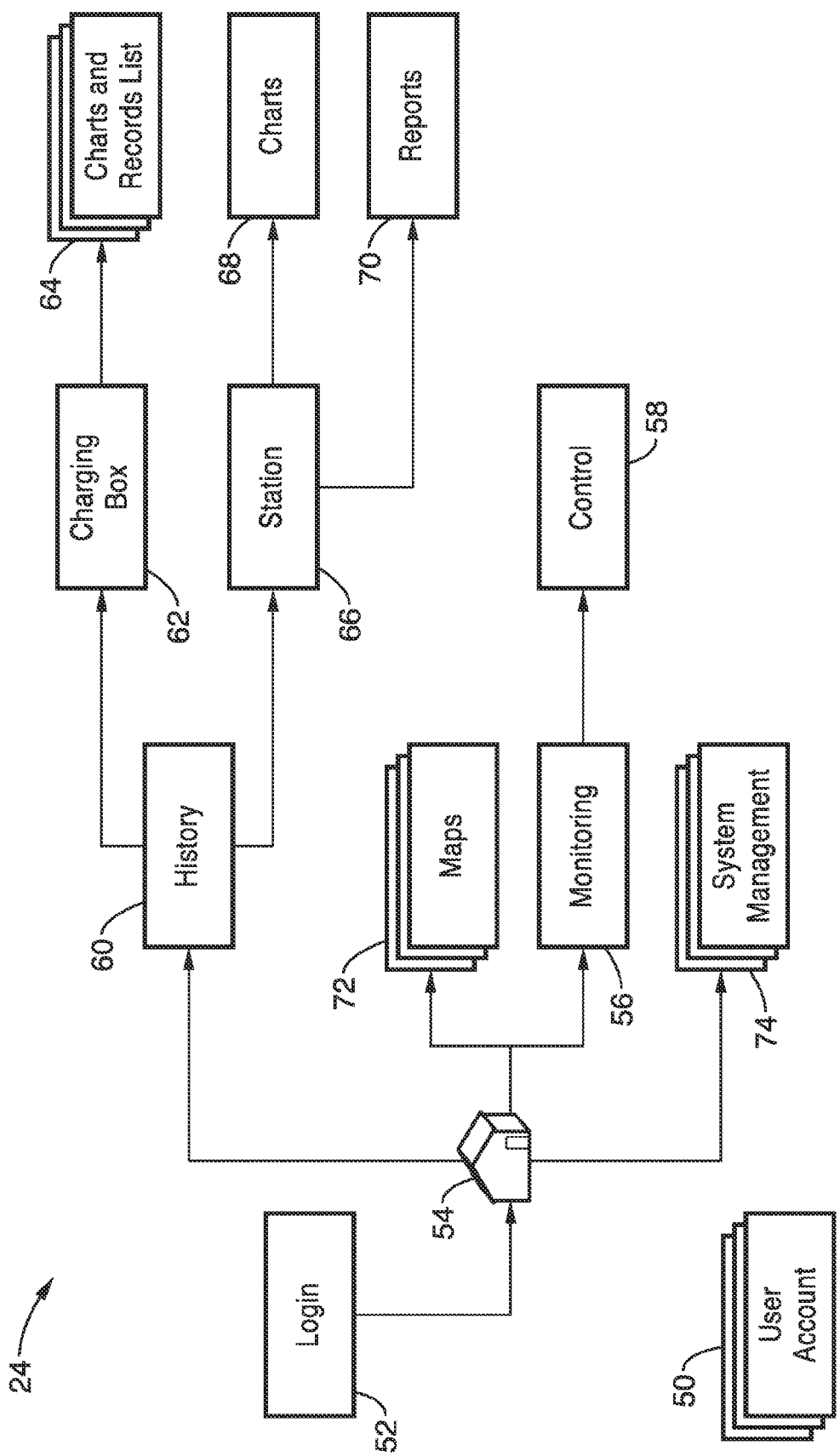
FIG. 4 shows a detailed schematic diagram of the monitoring and control center software of FIG. 1.

FIG. 4 shows a schematic diagram of the monitoring and control center software 24. In a preferred embodiment, software 24 is configured as an application that allows for user access and manipulation over web interface 32 (e.g. web based management console). To maintain security, login screen 52 will generally require an account user 50 username and password (generally administrator) to allow for access to the system. From the home page 54, an administrator can have access to history, charts, reporting, maps, monitoring, control, system setup, etc.

From the history module 60, a user can generate and edit all required data, reports, etc. of the system. History module 60 allows access to all available station 66 records via charts 68 or reports 70, as well as charts and records list 64 for each charging control box 62. A map page 72 may be used to show the newest status of every station geographically, e.g. via Google maps or the like.

Monitoring page 56 allows display of station status which may be updated automatically according to a preset period of time interval, and allow for an administrator to manually check and control each gateway and/or station within the network 25. Control module 58 can turn on or off a selected station and retrieve its real-time status. The control module 58 for turning an EV bank on/off may be based on both manual and automatic input. Automatic control is set up ahead of time, and may be based on pricing signals, total energy available at a given time, personal preferences of EV owners and/or garage owners.

System management module 74 provides a setup feature that may be used to configure the system's parameters.

Figure 5:
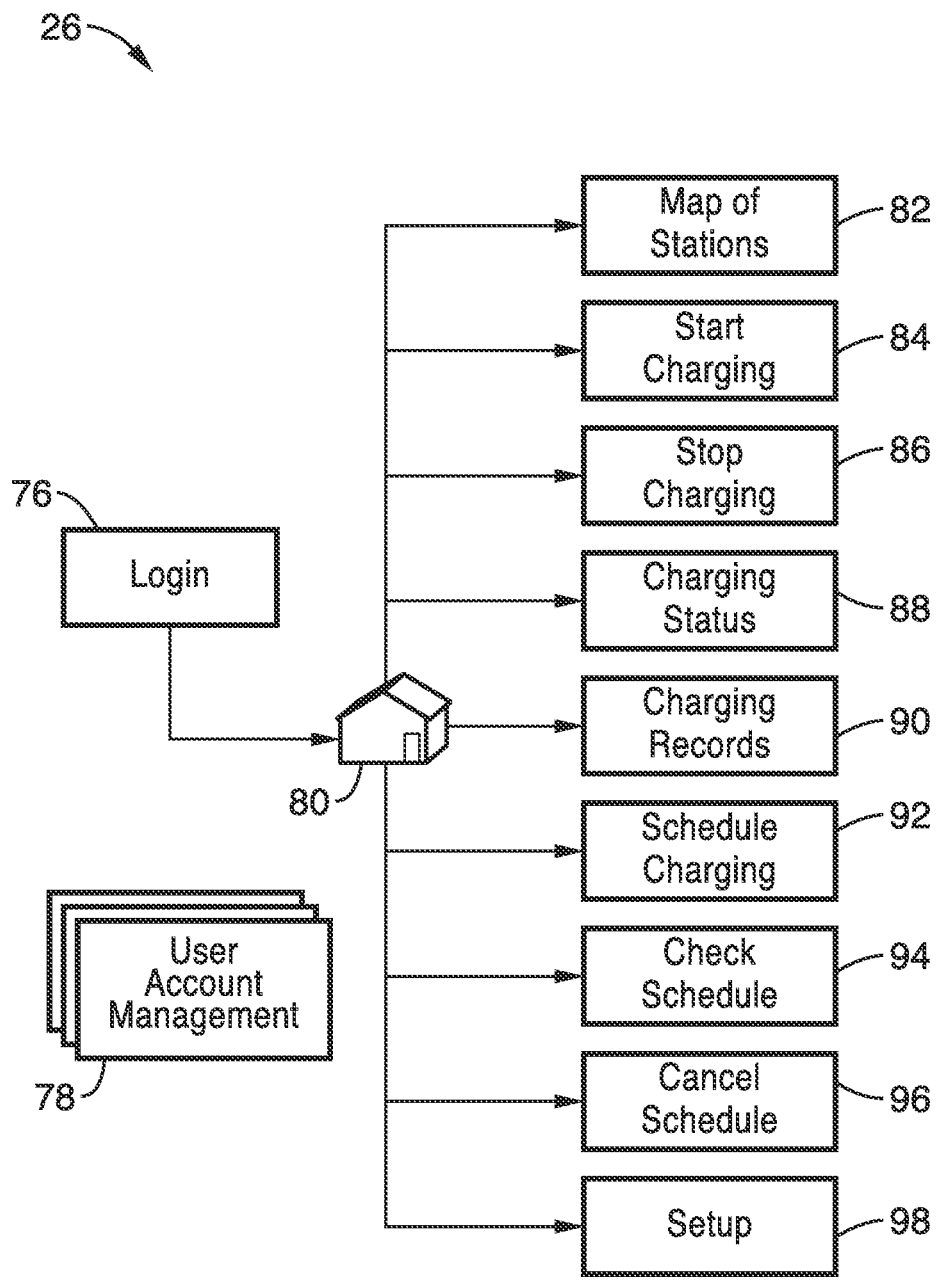
FIG. 5 shows a schematic diagram of the EV user control center application.

FIG. 5 shows a schematic diagram of the EV user control center application 26, which allows for real-time, web-based monitoring and control via a mobile device 28 or computer 30. In accordance with the present invention. The login screen 76 allows a user account 78 to enter user ID and password. After that the user is sent to the home screen 80, which has a number of user options: map stations 82 (e.g. show available and non-available charging stations for a selected parking lot and city), remote start charging 84 and stop charging 86, check charging status 88, charging records 90, schedule charging 92, check schedule 94, cancel schedule 96 and setup 98.

The charging station map page 82 may show charging stations that are available and their status, e.g. stand by, available, occupied, etc. The user can turn the station on (start charging 84) and retrieve information for display, such as time stamp, instantaneous voltage, instantaneous current, instantaneous frequency, power factor, active power, apparent power, and the main energy/total energy consumed.

The user may have access to charging station history to display the status of how much energy is consumed, how many times the system has failed, etc., to give diagnostic and history information about the system. Such screens may be useful for audits, billing, invoicing, etc.

The user may obtain data plots relating to stations, such as voltage distribution over time, a graph of variables such as voltage, frequency, power factor, active power, apparent power, and main energy shows up against a function of time for the charging station clicked. For example x-axis may comprise time, and, on the y-axis, voltage. For history, the user can go back 30 minutes, 2 hours, 8 hours, 1 day, 1 week, 1 month, half a year, one year, etc. as the history information is available through the SQL-based database 20.

In a preferred embodiment, the controller and data collector application 22 may be configured to control every station automatically as needed, in addition to collecting every station's status automatically and periodically. The data collector 22 application may be configured to run automatically when the server 35 is turned on and stop when the server 35 is shutdown. Manual control and monitoring of data collector 22 is not necessary, unless the gateways 34 and/or meters 12/15 are changed. Data collector may include a log system which records the data collector's status. In a preferred embodiment, the data collector 22 application uses a multiple thread structure which can handle many gateways 34 and meters 12/15 at the same time. This structure allows the collector 22 to monitor and control thousands and thousands of gateways 34 and meters 12/15 to server 35 capacity.

Figure 6:
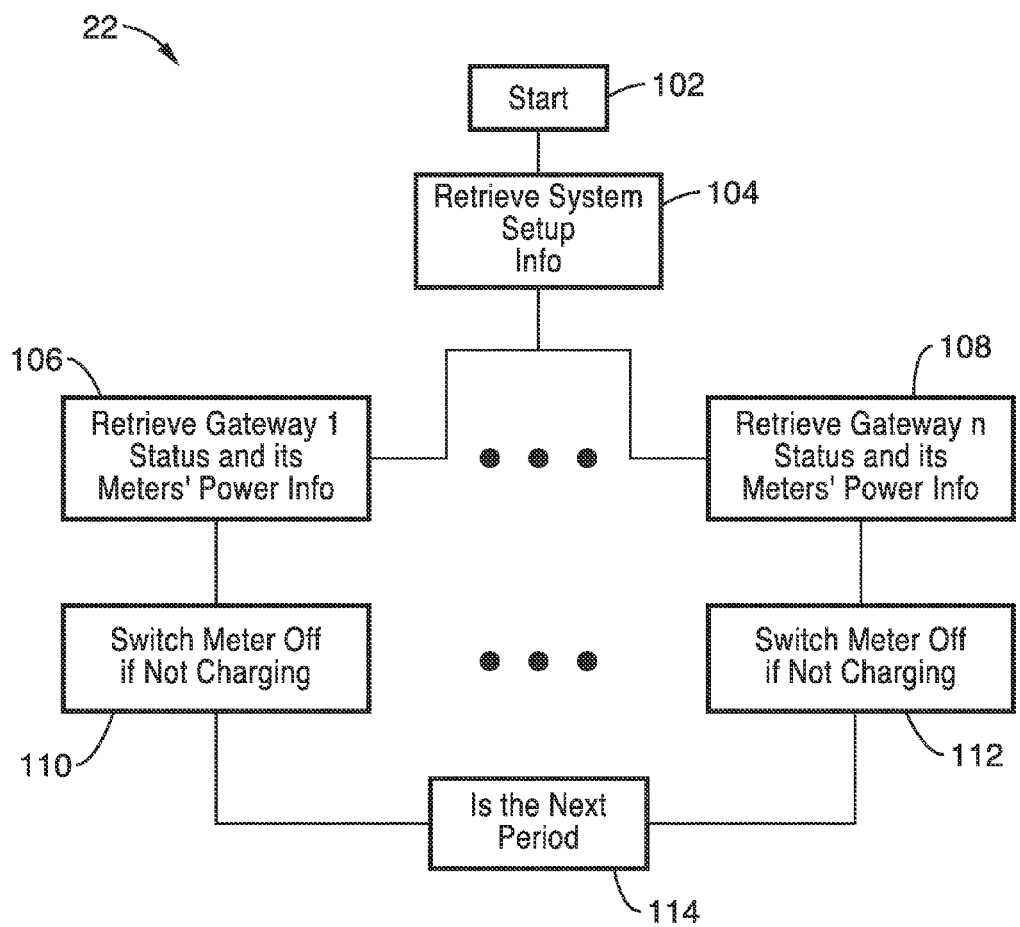
FIG. 6 illustrates a schematic diagram of a feature of the station controller and data collector application.

In one embodiment, shown in FIG. 6, a feature of the station controller and data collector application 22 allows for automatic switching of power to meters 12/15. At start 102, system setup data is retrieved at step 104. For each gateway 34, the status and corresponding power meter 12/15 is retrieved at 106/108. If the meter is not charging, it is switched off at 110/112 based on period 114. Thus, if a user finishes a charging and forgets to end the charging, the collector 22 will automatically switch off the charging station and close the charging.

User access to the system 10 is preferably dictated according to the following general roles and their limitations:

General Administrator: allowed to monitor and control any stations in the system; edit all basic info; charge an EV at any station in the system General Operator: allowed to monitor all stations in the system; edit a users in any city; charge an EV at any station in the system General Maintainer: allowed to monitor all stations in the system but charge a EV.

General User: allowed to charge at any stations in the system. Preferably, a general role can't be combined with another role.

The City/Area/Organization level may also be assigned the following roles and their limitations:

Administrator: allowed to monitor and control all stations in the City/Area/Organization; edit any user in the City/Area/Organization; charge an EV at any station in the City/Area/Organization.

Operator: allowed to monitor all stations in the City/Area/Organization; charge an EV at any station in the City/Area/Organization.

Maintainer: allowed to monitor all stations in the City/Area/Organization but charge an EV.

User: allowed to charge an EV at any stations in the City/Area/Organization.

Any City/Area/Organization level's role can be combined with another City/Area/Organization level's role.

SSL security may be available when needed. Accounts are preferably password encrypted, with a maximum login try times limitation. To make the system more secure and independent from a particular hardware configuration, the users preferably can't access any charging station directly (e.g. directly control any charging station or retrieve any power info, status from a station).

Figure 7:
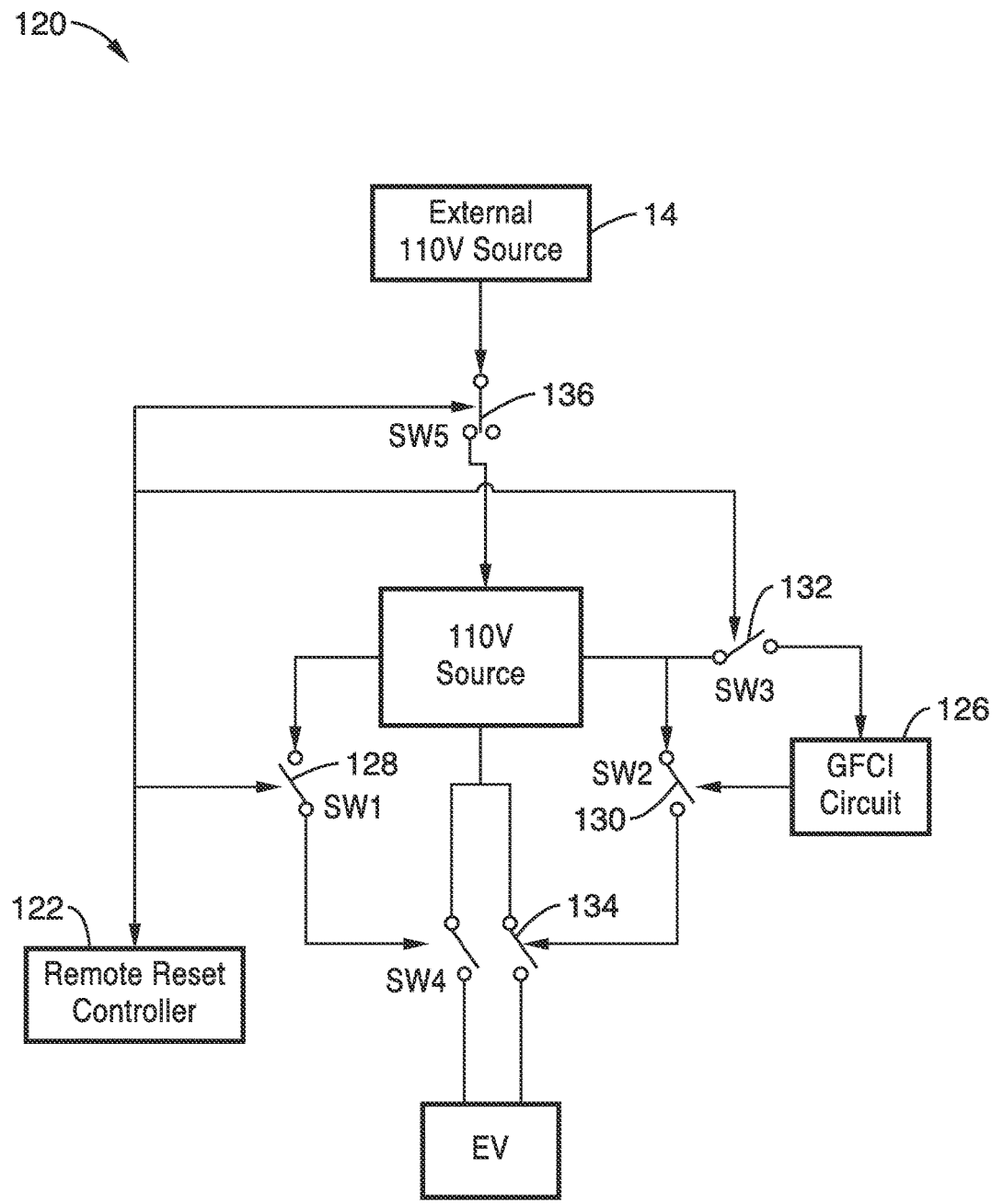
FIG. 7 is a control diagram of a safety relay in accordance with the present invention.

FIG. 7 shows a circuit diagram for a charging meter or control box 120 (which may be implemented in control box 12a/b, 15) with remote reset, which provides user protection from electric shock. First, when a ground fault happens, Ground Fault Circuit Interrupter (GFCI) circuit 126 will shut off the power to the EV 16 at SW2 130 to protect the user from electric shock. Second, the charging box 120 should not provide power on the handle of the cable 18 until the user plugs in their EV 16. Third, the system 120 should be able to be remotely reset from the server 35 when certain components go wrong and need to be reset.

The remote reset controller 122 controls one throw of the safety relay (SW4) 134 directly while GFCI circuit 126 controls the other one. When the user unplugs the EV 16, the EV unplug status is detected by the pilot signal monitor; therefore, one throw of SW4 134 can be shut off to stop providing power on the handle of the charging cable. To reset the GFCI circuit 126, the remote reset controller 122 can reset the GFCI circuit by switching SW3 132 off and on. An internal source 124 is coupled to remote reset controller 122 via SW1 128. As for the remote reset feature, when the remote reset controller 122 receives the reset command from the server 35, it will switch SW5 136 to another position, which will turn off the system from external power source 14. After that, because of losing power, SW5 136 will be back to its default position, which will turn on the system back again.

Referring to FIGS. 8A through 12B, each charging box 12/15 is preferably assigned one of a number of available multiplexing charging algorithms. The algorithms detailed below an in FIGS. 8A through 12B are preferably in an application (e.g. station controller and data collector 22) executable on a server 35 or processor. A control box's 12/15 charging algorithm can be changed easily to another available algorithm at the station controller and data collector 22 when needed. A new algorithm can be added into EV charging system 10 to allow any control box to use the new algorithm. In the station controller and data collector 22, every charging control box 12/15 is assigned an independent thread or process automatically at the server 35 side when the server 35 machine(s) is(are) turned on. Every thread or process will check its control box's station and its charging status if the charging is submitted to the station, as well as do some actions with a period of time, e.g. a specified interval or gap. This interval or gap is adjustable via the station controller and data collector 22 on an as-needed basis. After the thread or process finishes these tasks, it will enter the sleep status until the next loop start time has arrived. So, in the system, the start and stop of every algorithm's flow chart applies to every loop's start and stop.

The standard scheduling algorithm to switch on/off the charging control box 12/15 for charging assumes that the current level (I) starts falls below a level (e) for a certain number of reads (n) from the current sensor. The assumption of this standard algorithm is that the I1,I2, . . . In, which are measurements taken at equal intervals in time t, are all <E for the charging algorithm to turn the charging off from a given outlet on the multiplexer, i.e., the Equation 1 is satisfied:

$$I_j < E, \text{ for all } j, j=1, n \quad (1)$$

However the standard algorithm when applied to actual charging stations may or may not be satisfied, as there is generally not a set standard way in which the EV 16 manufacturers are handling the current flow through their EVs, resulting in multiple ways of charging the EV 16 (i.e. how current varies over time).

Therefore, a modified algorithm may be used to provide for such variations in individual EVs. The modified algorithm, which would constitute a generalized algorithm as defined below, would in general handle variations in the BMS charging algorithms themselves. For example, in the Toyota BMS, at the start of charging, the current falls to zero for a certain amount of time (even though the battery is not fully charged) and stays there for a while, and then comes back up to the maximum.

Therefore, the modified algorithm would apply according to Equations 2 and 3:

$$I_j < E_j, \text{ for all } j=1, n \quad (2)$$

$$I_j > e_j \text{ for all } j, j=1, n \quad (3)$$

where $E_j$ and $e_j$ are the upper and lower bound of the current respectively at each measurement point for a number of measures (n). n would be determined based on trial and error of measurement of the BMS system. n itself would depend on the type of BMS which in turn would depend on the type of EV 16. The methodology would try to maximize the $(E_j - e_j)$ for each j so that the filter for each type of EV 16 is as wide as possible and can capture variations found in individual EVs of a particular type (e.g. two Nissan Leafs). As such an algorithm is refined, the methodology may potentially be usable to distinguish between different types of EVs 16.

In addition to the general and modified algorithms above, a number of different charging algorithms may be interchangeably used for multiplexing between EV's charging on the system 25.

Figure 8A:
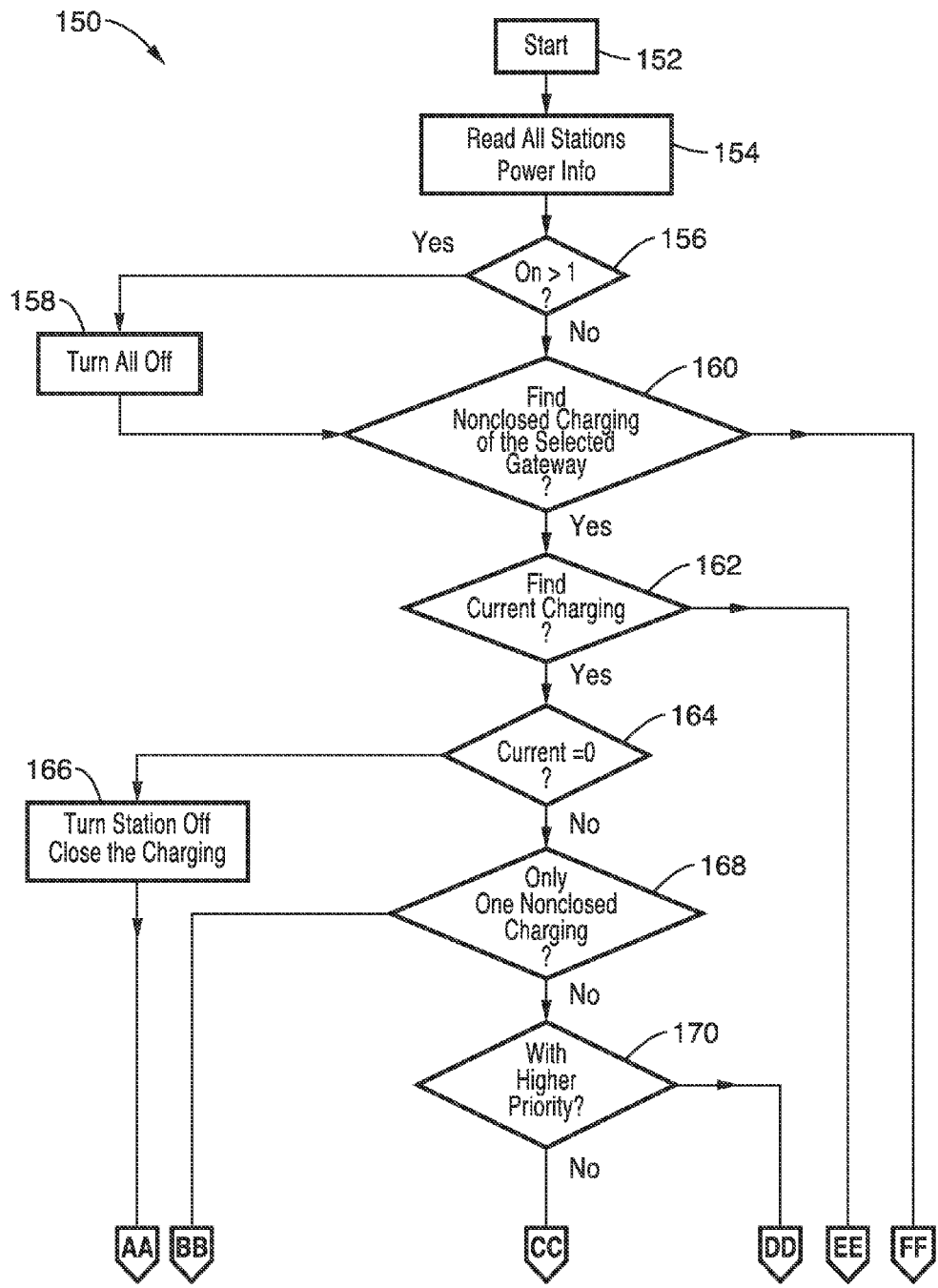
FIGS. 8A and 8B illustrate a schematic flow diagram of a round-robin charging algorithm in accordance with the present invention.
Figure 8B:
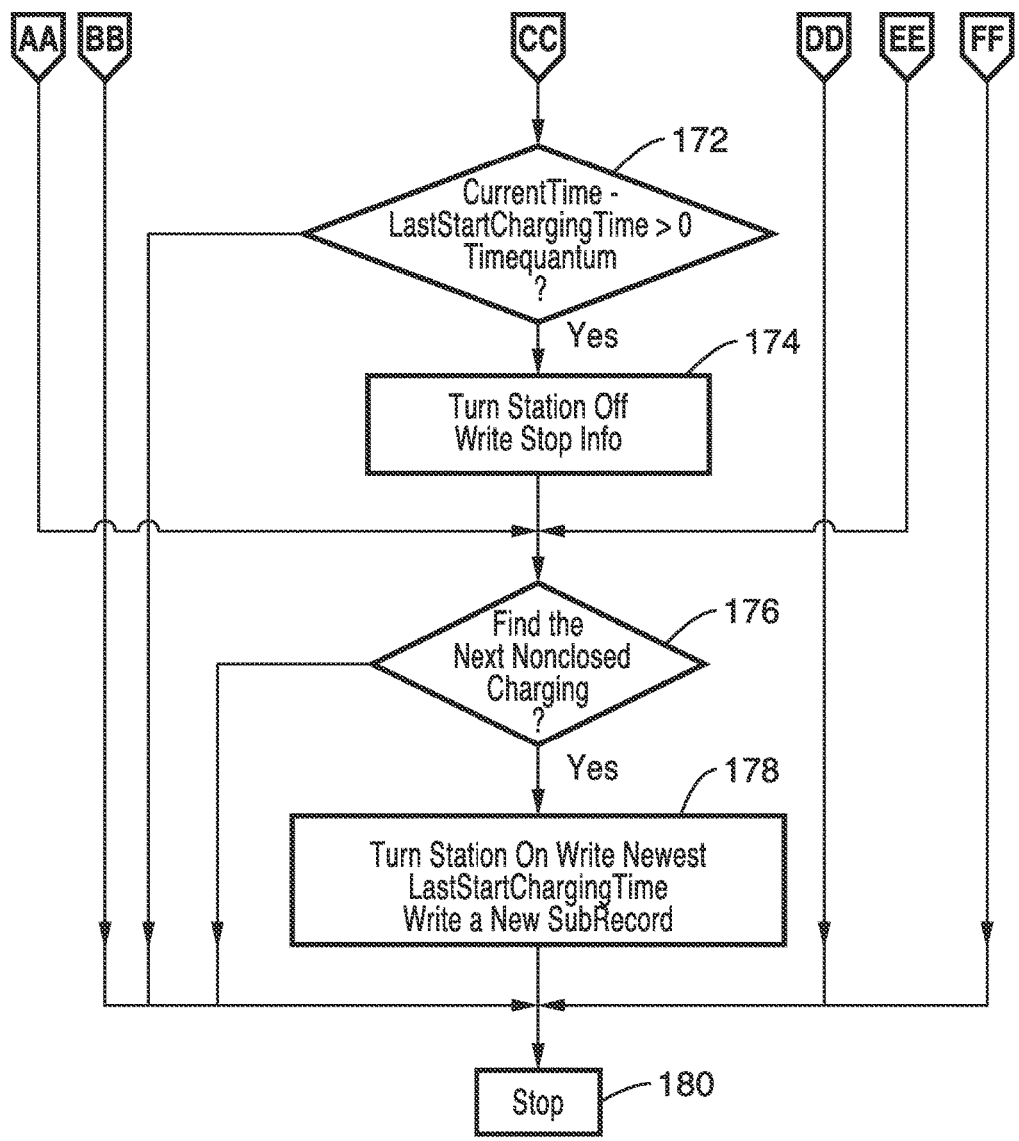

FIGS. 8A and 8B illustrate a schematic flow diagram of a round-robin charging algorithm 150 in accordance with the present invention. Generally, round-robin charging algorithm 150 is used when a control box's 12/15 power source 14 doesn't allow all stations get charging at the same time.

At step 152 the newest loop of control box's thread or process is started. At step 154, each stations' power info and status for a control box is read and save the info into the system's database 20.

At step 156, the algorithm checks whether more than 1 station is on or not. If yes, it goes to the algorithm proceeds to step 158; if not, it skips to step 160.

At step 158, all stations are turned off. At step 160, the algorithm then queries whether there are EV's 16 or not. If yes, it proceeds to step 162, if not, it proceeds to step 180. Next, the algorithm finds which submitted charging stations should be in 'on' status or 'in charging' status. If the charging is found, it proceeds to step 164; if not, it goes to step 176.

At step 164, a determination is made whether the station's power current is less than a given threshold value (default value is 0 Amp and can be changed for a control box 12/15 when it is needed). If yes, then it is assumed that charging is finished, or the EV 16 detached from the system 25, and the algorithm proceeds it goes to step 166. If not, it skips to step 168.

At step 166 the station is turned off and charging is closed, an email, text or other message may then be sent to the user and the algorithm proceeds to step 176.

If only one charging EV 16 is found at step 168, the algorithm proceeds to step 180 (this means the single charging can continue until it is finished or other charging is started). If not, it goes to step 170, where charging priority is determined. If the priority of the charging EV 16 is higher than all others, it proceeds to step 180. Otherwise, it proceeds to step 172. When a control box's 12/15 algorithm is round-robin, the charging control box's time quantum (how long a charging can get power in a turn) is 60 minutes (a default value that may be varied). The quantum of a control box can be changed as needed. If a charging time in the current turn is more than the quantum, then it proceeds to step 174. If not, it goes to step 180.

At step 174, the station is turned 'off' and the charging is changed into 'waiting' status.

At step 176, the algorithm finds the next waiting charging. If found, it goes to step 178. If not, it goes to step 180. At step 178, the station is turned 'on,' and the last start charging time and charging status is saved.

At step 180, the loop is finished and the thread or process goes into sleep status until the start time of the next loop has arrived.

Figure 9:
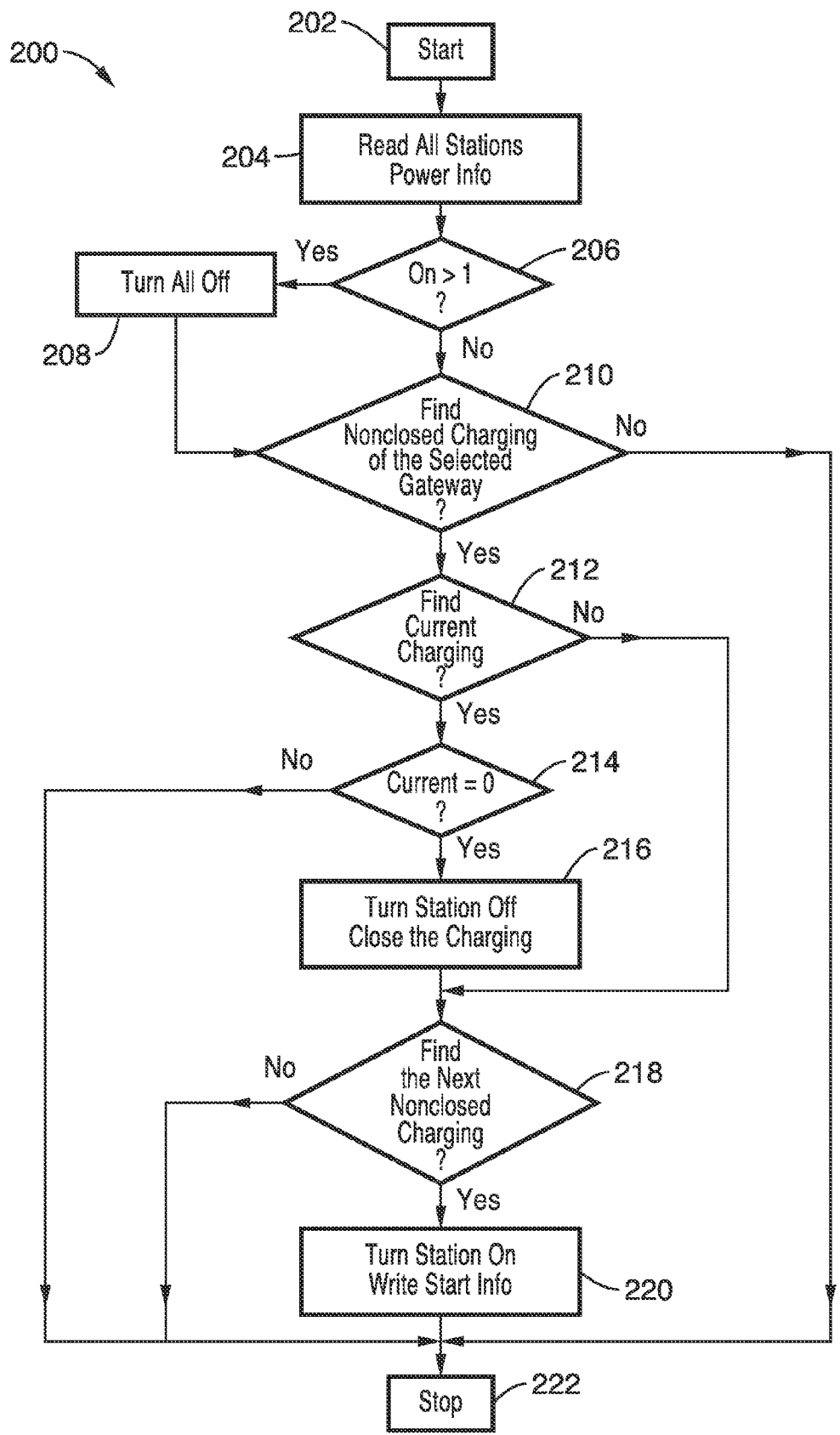
FIG. 9 illustrates a schematic flow diagram of a first-come, first-serve charging algorithm in accordance with the present invention.

FIG. 9 illustrates a schematic flow diagram of a first-come, first-serve charging algorithm 200 in accordance with the present invention. First-come, first-serve charging algorithm 200 may also be used for when a control box's 12/15 power source 14 doesn't allow all stations get charging at the same time.

At step 202, the newest loop of the control box's thread or process is started. At step 204, power info of the control box and stations' status is read then saved into the system's database 20.

At step 206, the algorithm checks whether more than 1 station is on or not. If yes, it goes to step 208; if not, it goes to step 210.

At step 208, those stations are turned 'off' and then it goes to step 210. If charging EV's are found, it goes to step 212. Otherwise, it goes to step 222.

At step 212, the current charging station is found (i.e. the corresponding station is on and the charging gets power). If yes, it goes to 214. If not, it goes to step 218.

At step 214, the algorithm queries whether the station's power current (amp) is less than a threshold value (default value is 0, Amp and can be changed when it is needed). If yes, charging is finished or the EV left, and it goes to step 216; otherwise, it goes to step 222.

At step 216, the station is turned 'off' and charging closed.

At step 218, if the algorithm finds the next submitted charging, it goes to step 220. Otherwise, it goes to step 222. At step 220, it turns the station 'on' and changes the charging status as "charging."

At step 222, the loop is finished and the thread or process goes into sleep status until the next loop start time has arrived.

Figure 10:
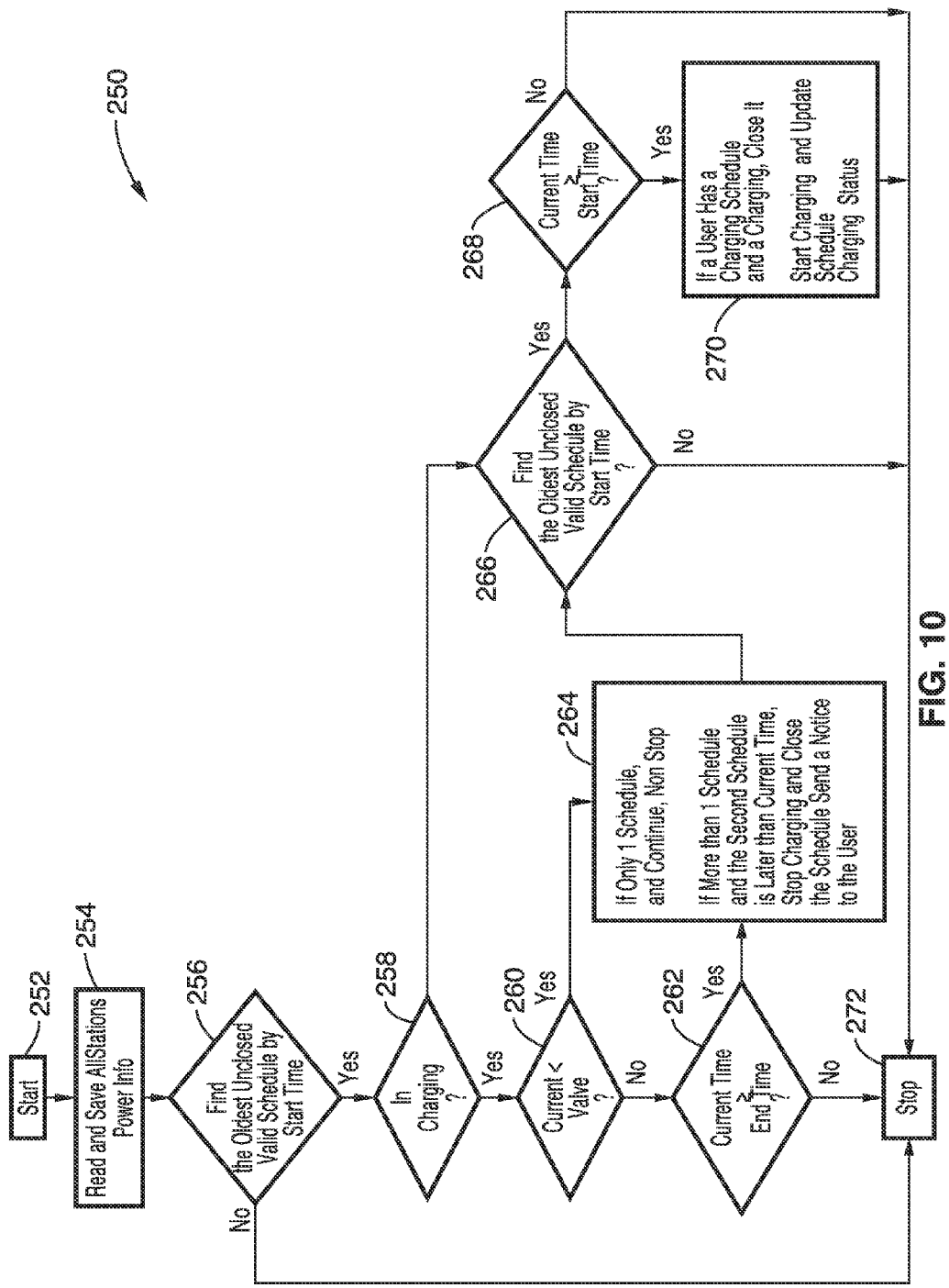
FIG. 10 illustrates a schematic flow diagram of time schedule—auto-start algorithm in accordance with the present invention.

FIG. 10 illustrates a schematic flow diagram of Time schedule—auto-start algorithm 250 in accordance with the present invention. Generally, an EV 16 user must plug his/her EV in the reserved station before the schedule's start time. For example, if a user reserved the station, e.g. from 8:00 am-12:00 pm, the user must plug in the EV 16 before 8:00 am. The algorithm will start charging automatically at 8:00 am. At 8:00 am, if EV 16 is not plugged in, the station's power current(amp) will be lower than the threshold value, and the charging will be stopped by the station controller and data collector.

At step 252, the newest loop of control box's thread or process is started. At step 254, each stations' power info and status for a control box is read and save the info into the system's database 20.

At step 256, the algorithm finds all unclosed and scheduled chargings, which are sorted by the start time in the ascending order. Those chargings' start times should be in the current date (today). If found at least this kind of charging, it goes to step 258; if not, it goes to step 272.

At step 258, it queries whether any schedule is in charging status. If yes, it goes to step 260; otherwise it goes to step 268.

At step 260, the algorithm queries whether the station's power current(amp) is less than a threshold value (default value is 0 Amp and can be changed as needed). If yes, it goes to step 264; otherwise, it goes to step 262. If the current timestamp is greater than or equals to the schedule's end time, it goes to step 264, otherwise, it goes to step 272.

At step 264, if only one schedule is found, and that schedule allows continuing the charging after the end time has arrived, the charging will continue until it finishes or another schedule's start time has arrived. If a second schedule exists and its start time is earlier than or equal to the current time, it stops the first schedule and closes the charging, turns off the meter, and sends an email or other message to the user.

At step 266, the algorithm searches for the next unclosed schedule with the earliest start. Its start times should be in the current date (today). If the schedule can be found, it goes to step 268; if not it goes to step 272.

At step 268, if the current time is greater than or equal to the start time, it goes to step 270; otherwise, it goes to step 272.

At step 270, if the user has another charging or has another scheduled charging which is in charging status, it is closed and the station turned off. The schedule is started and charging status updated.

At step 272, the loop is finished and the thread or process goes into sleep status until the next loop start time has arrived.

Figure 11A:
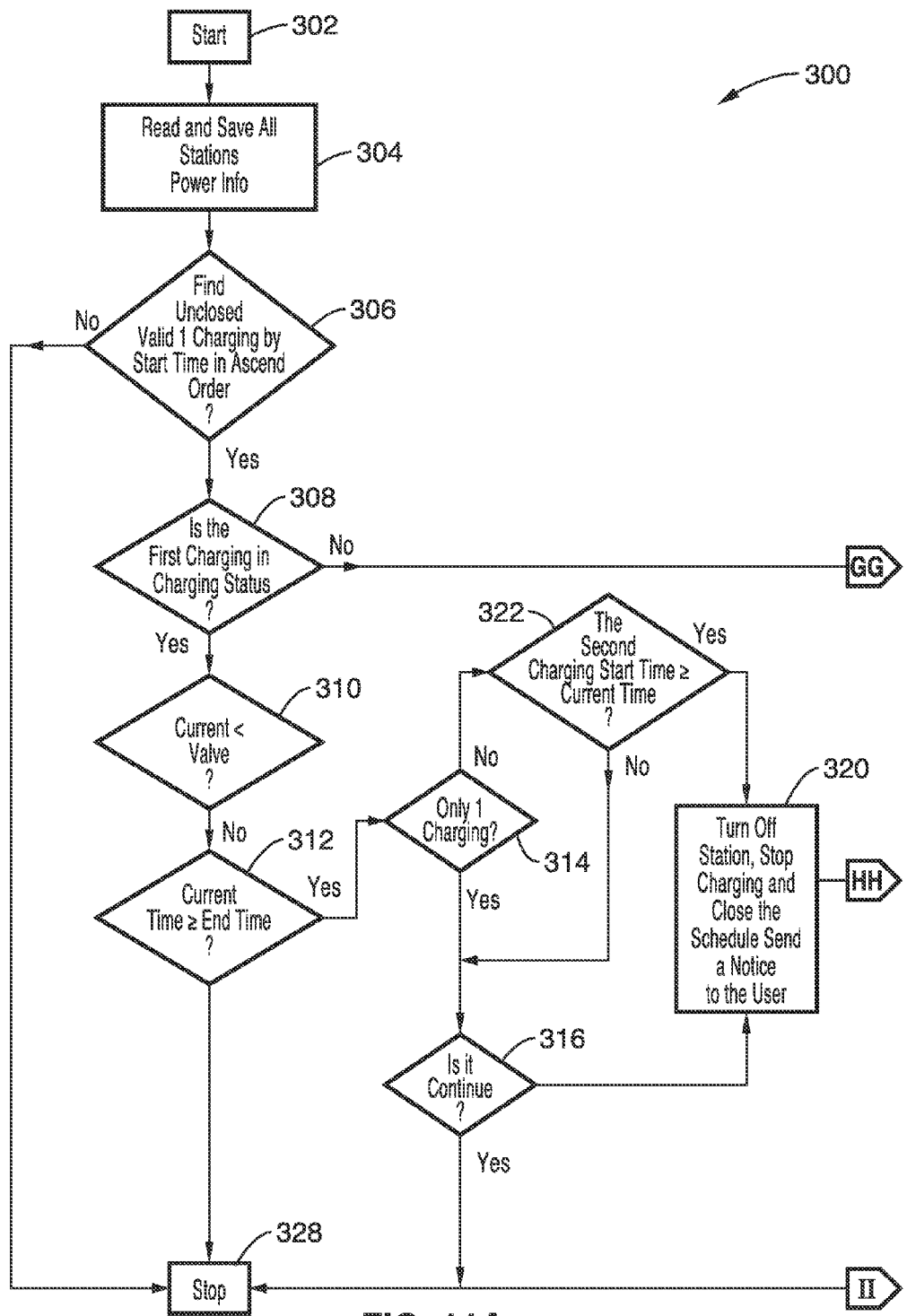
FIGS. 11A and 11B illustrate a schematic flow diagram of a time schedule—manual-start algorithm in accordance with the present invention.
Figure 11B:
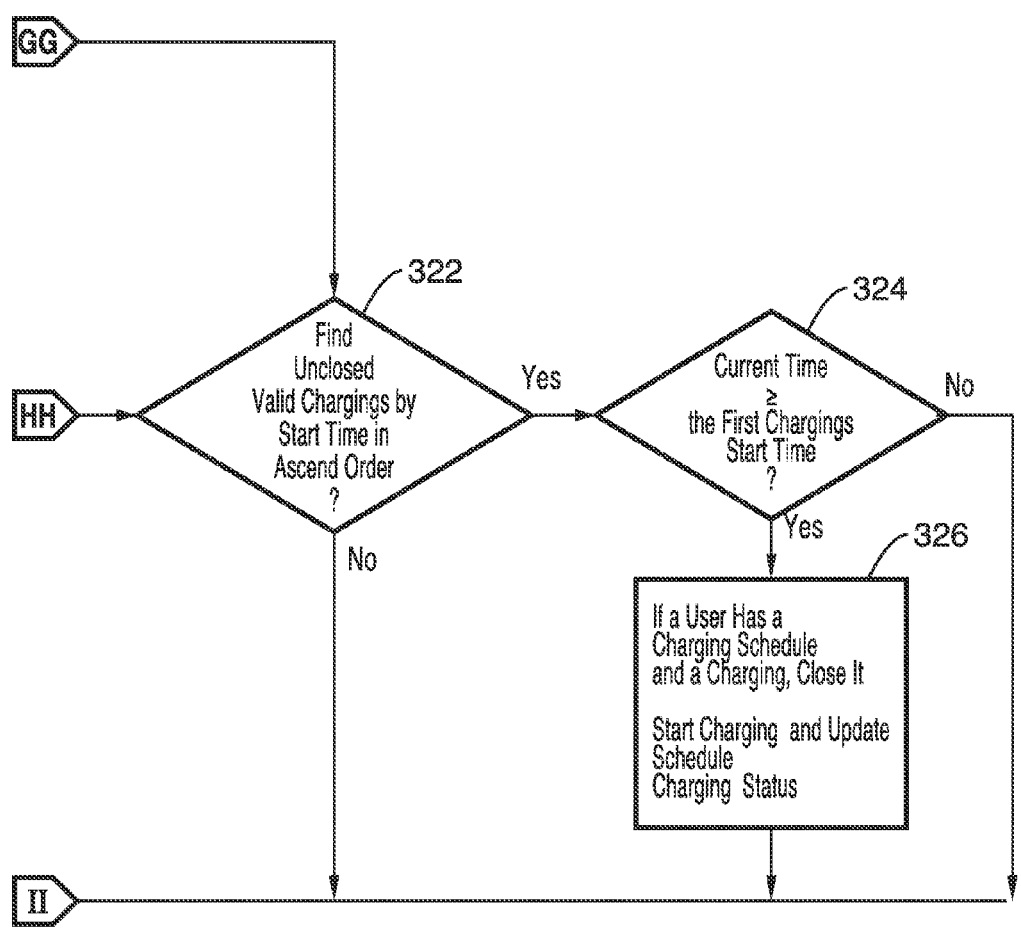

FIG. 11 illustrates a schematic flow diagram of Time schedule—manual-start algorithm 300 in accordance with the present invention. An EV user can plug his/her EV in before the start time or between the start time and the end time and start it. For example, today, if one reserved a station from 8:00 am-12:00 pm, he can plug the EV 16 before 12:00 pm and start it. The schedule will be started after the user submits it if the submitted time is between 8:00 am-12:00 pm or at 8:00 am if the user submits it before 8:00 am At step 302, the newest loop of control box's thread or process is started. At step 304, each stations' power info and status for a control box is read and the info saved into the system's database 20.

At step 306, the algorithm finds all unclosed schedules and sorts them by the start time in ascending order. Those schedules' start times should be in the current date (today). If at least one of this kind of schedule can be found, it goes to step 308; if not, it goes to step 328.

At step 308, if the first schedule is in charging status, it goes to step 310; otherwise it goes to step 322.

At step 310, the algorithm queries whether the station's power current (amp) is less than a threshold value (default value is 0 Amp and can be changed if needed). If yes, it goes to step 314; otherwise, it goes to step 312.

At step 312, if the current timestamp is greater than or equals to the schedule's end time, it goes to step 314, otherwise it goes to step 328.

At step 314, if only one schedule is found in the current day(today), it goes to step 316. Otherwise, it goes to step 318.

At step 316, if the schedule allows continuing the charging after its end time has arrived, it goes to step 328, the charging will continue until it finishes or another schedule's start time has arrived. Otherwise, it goes to step 320.

At step 318, if a second schedule exists and its start time is earlier than or equal to the current time, it goes to step 320. If not, it goes to step 316.

At step 320 the first schedule stopped, charging closed, and station is turned off. A notification (e.g. email, text) may be sent to the user.

At step 322, the algorithm finds all unclosed schedules, which are sorted by the start time in ascending order. Those chargings' start times should be in the current date (today). If found at least one schedule can be found, it goes to step 324; if not, it goes to step 328.

At step 32, if the current timestamp is greater than or equals to the first schedule's start time, it goes to step 326; otherwise it goes to step 328.

At step 326, if the user has another charging or has another scheduled charging which is in charging status, it is closed and station is turned off. A notification (e.g. email, text) may be sent to the user. The schedule is started and status updated.

At step 328, the loop is finished and the thread or process goes into sleep status until the next loop start time has arrived.

Figure 12A:
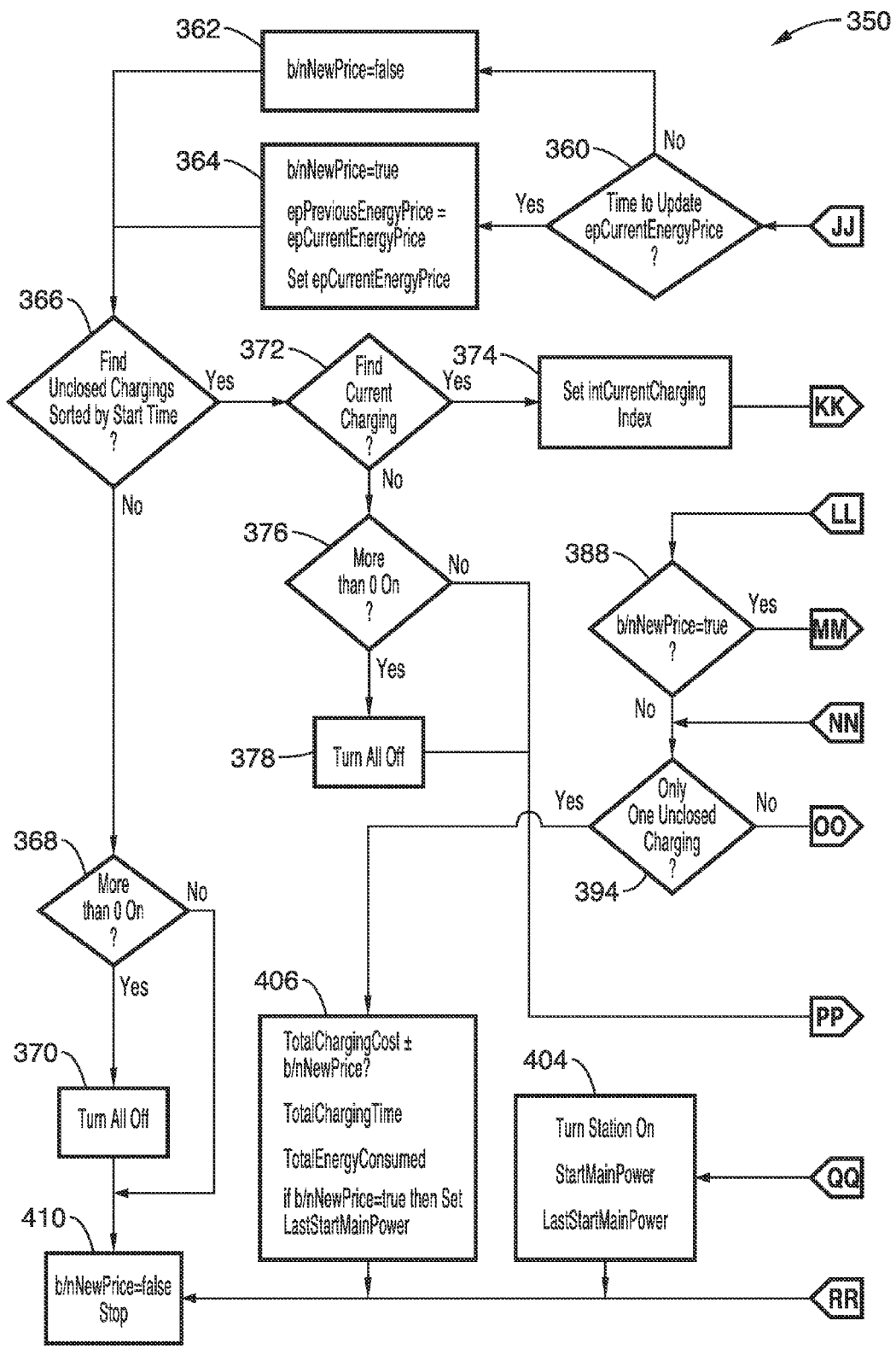
FIGS. 12A and 12B illustrate a schematic flow diagram of an energy price schedule & round-robin combination algorithm in accordance with the present invention.
Figure 12B:
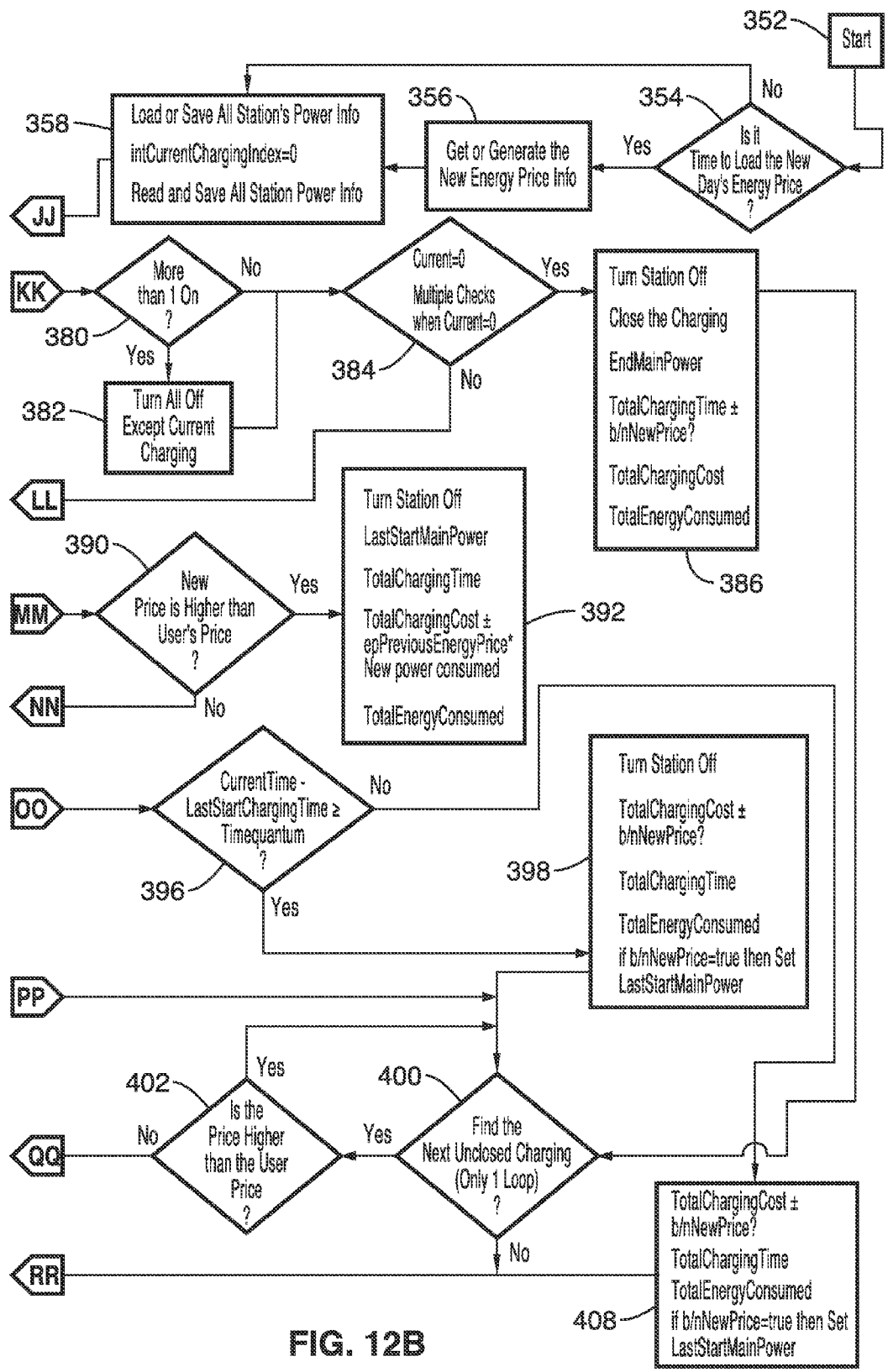

FIGS. 12A and 12B illustrate a schematic flow diagram of an energy price schedule & round-robin combination algorithm 350 in accordance with the present invention. When a charging control box is assigned this algorithm, different energy prices can be selected by the EV 16 user when this user submits a charging. The user can only get charging when the energy price is lower than the user accepted price even though it is the user's turn.

At step 352, the newest loop of a control box's thread or process is started.

At step 354, the algorithm whether it is the time to load the new day's (also hour, work, for week, month, season, etc.) energy price. If yes, it goes to step 356. If not, it goes to step 358.

At step 356, the algorithm gets or generates the new energy price. When the new price is available, the price is read. If no new price info, the price can be generated or keep using the old price.

At step 358, the algorithm loads and/or saves the station's power price info. A control box's 12/15 stations' power info and status is read and the info saved into the system's database 20.

At step 360, the algorithm queries whether it is the time to update the control box's current energy price. If yes, it goes to step 364. If no, it goes to step 362.

At step 362, the algorithm sets variable blnNewPrice=false, and then goes to step 366.

At step 364, the algorithm assigns the current price object to previous price variable, and updates the current price object to the newest price.

At step 366, the algorithm finds all unclosed schedules and sorts them by the start time in ascending order. Those schedules' start times should be in the current date (today). If at least one this kind of schedule can be found, it goes to step 372; if not found, it goes to step 368.

At step 368, the algorithm queries whether more than 0 station (are) on, it goes to step 370 if so. Otherwise, it goes to step 410.

At step 370, the algorithm turns every station off if it is on. At step 372, if any current charging is found, it goes to step 374, otherwise it goes to step 376.

At step 374, the algorithm sets current charging index to intCurrentChargingIndex, then it goes to step 380.

At step 376, the algorithm queries whether more than 0 station are on, and goes to step 378 if so. Otherwise it goes to step 398.

At step 378, the algorithm turns every station off if it is on, then goes to step 400.

At step 380, the algorithm queries whether more than 1 station is are on, and goes to step 382 if so. Otherwise it goes to step 384.

At step 382, the algorithm turns all stations off except the current charging's station.

At step 384, the algorithm queries whether the charging's power current(amp) is less than a threshold value (default value is 0 Amp and can be changed when needed). If yes, it goes to step 386; otherwise, it goes to step 388.

At step 386, the algorithm turns the station off, closes the charging, calculates charging costs and total energy consumed. Notification is sent to user, then it goes to step 400.

At step 388, the algorithm queries whether the price is changed, and goes to step 390 if so. If not, it goes to step 394.

At step 390, the algorithm queries whether the new energy price is higher than the user's accepted price when this user submit his/her charging, and goes to step 392 if so. Otherwise, it goes to step 394.

At step 392, the algorithm turns the station off, calculates charging costs and power consumed, etc., then goes to step 400.

At step 394, the algorithm queries whether only one user submitted a charging, and goes to step 406 if so. Otherwise, it goes to step 396. The algorithm then queries whether the current charging time is more than the quantum, and goes to step 398 if so, otherwise it goes to step 408.

At step 398, the algorithm turns the station off, calculates charging costs and power consumed, etc., then goes to step 400.

At step 400, the algorithm finds the next charging. If yes, it does to step 402. If not, it goes to step 410.

At step 402, the algorithm queries whether the next charging's accepted price lower than the current energy price, and goes back to step 400 if so. Otherwise, it goes to step 404 (a charging having an accepted price that is higher than the current price).

At step 404, the algorithm turns the station on, updates the charging status and power info, and goes to step 410.

At step 406, the algorithm calculates the charging's energy consumed and total charging cost, and goes to step 410.

At step 408, the algorithm calculates the charging's energy consumed and total charging cost.

At step 410, the loop is finished and the thread or process into sleep status until the next loop start time has arrived.

Referring back to FIG. 2, an HF RFID module 36 (including an antenna) is used to read an EV user's RFID badge 38. When the charging control box 12/15 is on, the RFID reader 36 will enter inventory status to read tags 38. After a tag's ID is read, the charging control box 12/15 LCD screen (not shown) will prompt user to select a station. Then the tag's ID and the selected station info will be saved into the gateway 34, waiting for data collector 22 to read it. The data collector 22 checks the charging control box by a preset period of time to find any new coming tag ID and selected station. If a new tag ID is a valid user's tag ID and the selected station is included, a new charging will be created and saved into the database 20. Data collector 22 will decide to start, stop or wait for the new created charging based on the charging control box's charging algorithm and the status of other existed charges of the charging control box.

Figure 13:
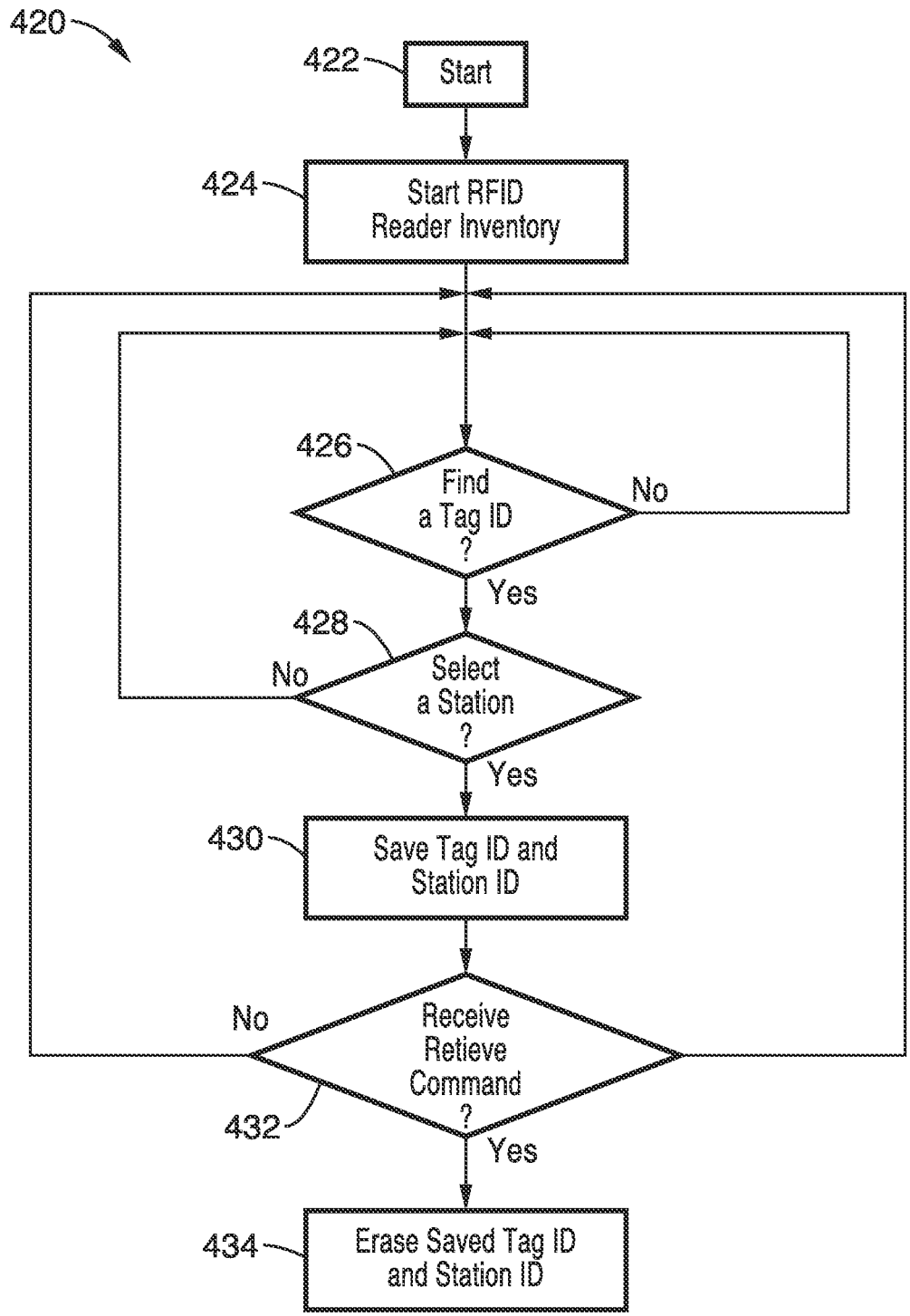
FIG. 13 illustrates a schematic diagram of an EV charging algorithm with RFID at the charging control box side.

FIG. 13 illustrates a schematic diagram of an EV charging algorithm 420 with RFID at the charging control box 12/15 side. At step 422, the charging control box 12/15 is turned on, and the RFID reader's 36 inventory is started at step 424. If a tag 38 is read at step 426, the algorithm proceeds to step 428. Otherwise, it waits until a tag 38 is read.

At step 430, the tag's ID and the station's ID selected by a user are saved. If the charging control box 12/15 has received a retrieve command from the server 35 at step 432, it goes to step 434, where saved tag ID and station ID are erased. Otherwise, it goes to step 426 and waits until another tag 38 is read.

Figure 14:
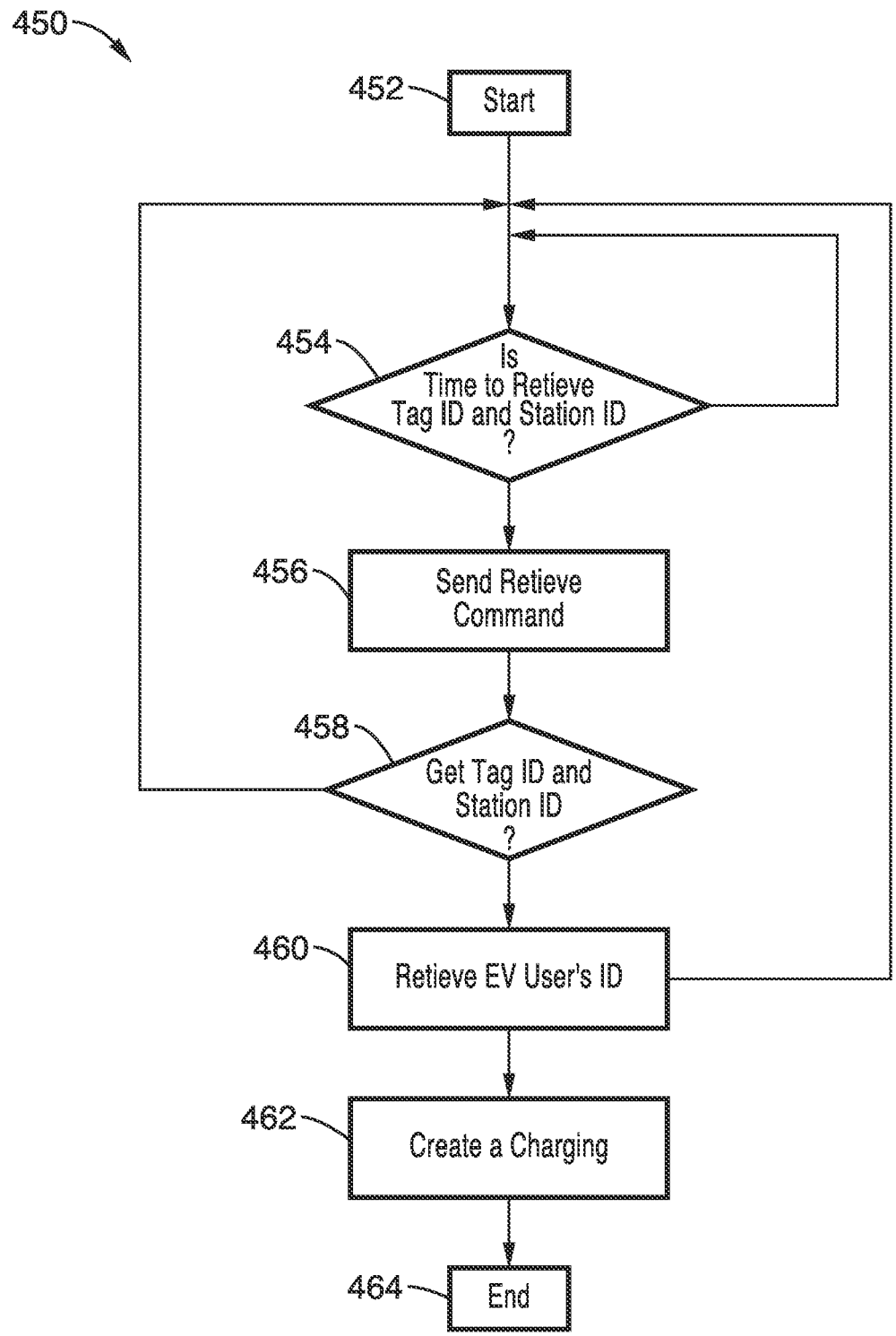
FIG. 14 illustrates a schematic diagram of an EV charging algorithm with RFID at the at the server side.

FIG. 14 illustrates a schematic diagram of an EV charging algorithm 450 with RFID at the at the server side. At step 452 the thread or process of a charging control box is started.

At step 454 the algorithm queries whether the next retrieve time has arrived, and goes to step 456 if so. If not, the thread or process will remain in sleep status.

At step 456, the algorithm sends a retrieve command. If a tag ID and a station are read at step 458, it goes to step 460. If not, the thread or process returns to sleep status until the next active time has arrived. At step 460, the tag ID and station ID are retrieved at step 462 to create a charging at 462. The station controller and data collector 22 will start this charging automatically. At step 464, the process ends.

Figure 15:
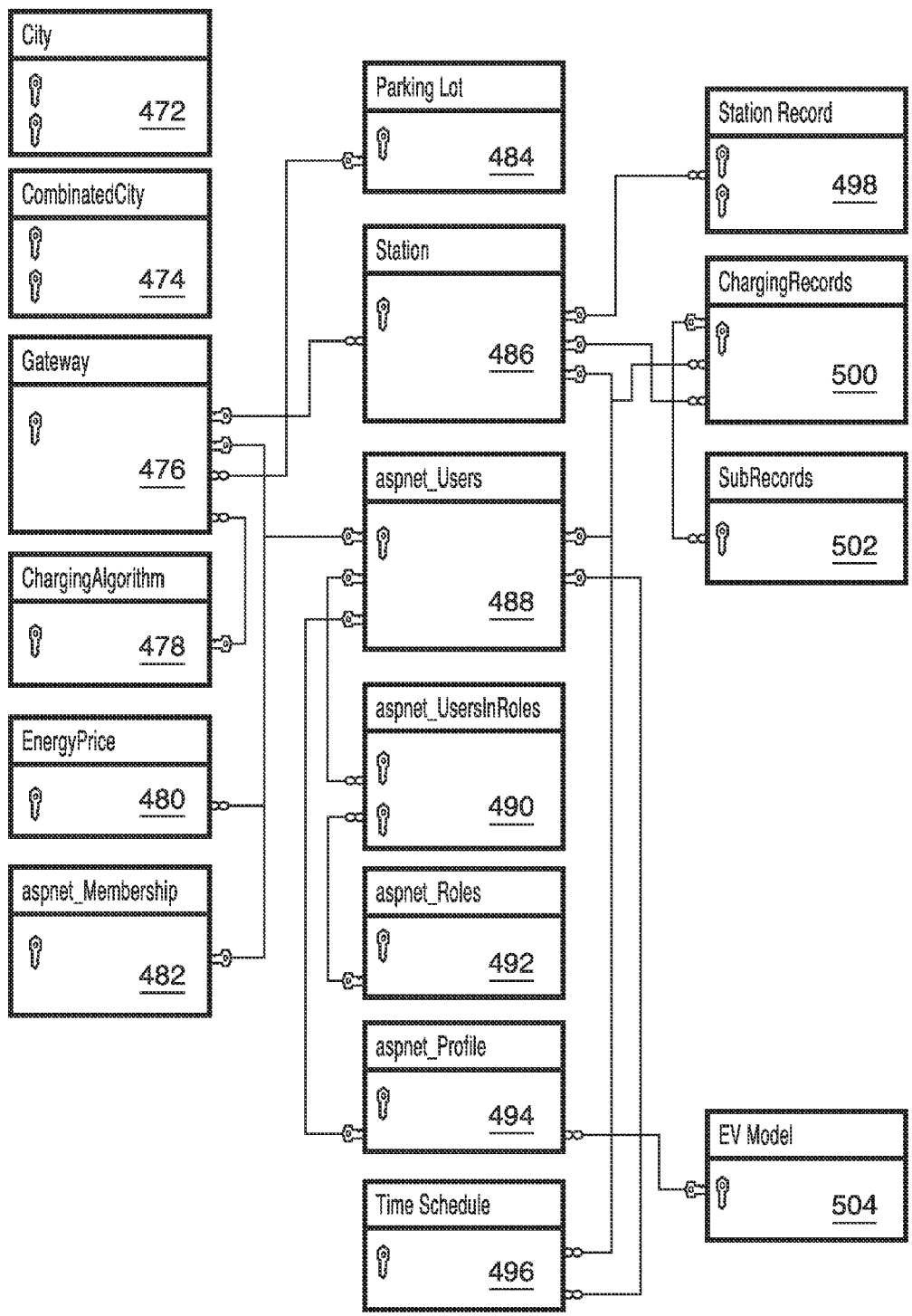
FIG. 15 shows an exemplary database configuration in accordance with the present invention.

FIG. 15 shows an exemplary database 20 configuration in accordance with the present invention. Database 20 includes all meters and gateways 476, station information 486, user information (e.g. membership 482, users 488, roles 490, 492, and profiles 494, etc.), time schedules 496, pricing 480, charging station records 498, charging algorithms 478, EV users 488, parking lots 484, cities, 472, 474, EV models 504, charging status and user charging records 500 and other management info 502, and all data collected by the data collector 22. For security and performance efficient reason, the database 22 may be separated into multiple parts: e.g. station part and user part.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

An example of computer program code for charging and control according to an embodiment of the invention is presented Appendix A.

From the discussion above it will be appreciated that the invention can be embodied in various ways, including the following:

1. A system for multiplexing charging of electric vehicles, comprising:
a server; said server coupled to a charging control module over a network; wherein said charging module comprises an input coupled to a voltage source; wherein each charging control module is configured to regulate distribution of voltage from the voltage source to an electric vehicle coupled to the charging control module; and software executable on said server for: identifying an electric vehicle coupled to the charging control module; and selectively distributing charging of the charging control module to multiplex distribution of voltage between the electric vehicle coupled to the charging control module and one or more other electric vehicles coupled to the server.

2. A system as recited in any of the previous embodiments, wherein selectively distributing charging further comprises: generating a charging schedule based on one or more parameters; and distributing voltage to the electric vehicles according to the charging schedule.

3. A system as recited in any of the previous embodiments, wherein voltage is distributed to the electric vehicles simultaneously.

4. A system as recited in any of the previous embodiments, wherein voltage is distributed to the electric vehicles sequentially.

5. A system as recited any of the previous embodiments, wherein voltage is distributed to the electric vehicles on a first-come, first-serve basis.

6. A system as recited in any of the previous embodiments, wherein voltage is distributed to the electric vehicles on a first-come, first-serve basis.

7. A system as recited in any of the previous embodiments, wherein voltage is distributed to the electric vehicles based on an established priority between the electric vehicles.

8. A system as recited in any of the previous embodiments, wherein voltage is distributed to the electric vehicles as a function of an established priority between the electric vehicles and an energy pricing threshold associated with an electric vehicle.

9. A system as recited in any of the previous embodiments, wherein voltage is distributed to the electric vehicles based on an automatically-starting time schedule.

10. A system as recited in any of the previous embodiments, wherein voltage is distributed to the electric vehicles based on manually-starting time schedule.

11. A system as recited in any of the previous embodiments, wherein the one or more parameters comprise one or more of: a schedule of a user associated with an electric vehicle, power characteristics of the voltage source; status of a grid associated with the voltage source, pricing data associated with the voltage source, and charging characteristics of the electric vehicle.

12. A system as recited in any of the previous embodiments, wherein the charging control modules comprise: a voltage input; a plurality of voltage outputs each configured to individually couple to an electric vehicle; wherein the supplied voltage may be multiplexed over the plurality of voltage outputs.

13. A system as recited in any of the previous embodiments, wherein the charging control module comprises: a sensor, said sensor configured for sensing a characteristic of the supplied voltage; wherein the charging control module is configured to upload data relating to said characteristic to said server.

14. A system as recited in any of the previous embodiments, wherein the characteristic comprises one or more of: current, voltage, frequency, and power quality of the supplied voltage.

15. A system as recited in any of the previous embodiments, wherein the server communicates with the plurality of charging control modules over a wireless network.

16. A multiplexing charge control apparatus for electric vehicles, comprising: a charging control module; said charging module comprising an input configured to be coupled to a voltage source and at least one power output configured to be coupled to an electric vehicle; said charging control module having a network connectable communications interface; and a remote server; said communications interface configured for communication between said server and said charging control module through a network gateway or other communications link; said communications interface configured for communication of charge control signals from said server to said charging control module for independently controlling distribution of power to said at least one output; wherein said control signals are configured for multiplexing distribution of charging the electric vehicle connected to said power output and a second electric vehicle coupled to the remote server.

17. An apparatus as recited in any of the previous embodiments, further comprising software executable on said server for: identifying an electric vehicle coupled to the charging control module; and selectively distributing charging of the charging control module to multiplex distribution of voltage between the electric vehicle coupled to the charging control module and the second electric vehicle.

18. An apparatus as recited in any of the previous embodiments, wherein selectively distributing charging further comprises: generating a charging schedule based on one or more parameters; and distributing voltage to the electric vehicles according to the charging schedule.

19. An apparatus as recited in any of the previous embodiments, wherein voltage is distributed to the electric vehicles simultaneously.

20. An apparatus as recited in any of the previous embodiments, wherein voltage is distributed to the electric vehicles sequentially.

21. An apparatus as recited in any of the previous embodiments, wherein voltage is distributed to the electric vehicles on a first-come, first-serve basis.

22. An apparatus as recited in any of the previous embodiments, wherein voltage is distributed to the electric vehicles on a first-come, first-serve basis.

23. An apparatus as recited in any of the previous embodiments, wherein voltage is distributed to the electric vehicles based on an established priority between the electric vehicles.

24. An apparatus as recited in any of the previous embodiments, wherein voltage is distributed to the electric vehicles as a function of an established priority between the electric vehicles and an energy pricing threshold associated with an electric vehicle.

25. An apparatus as recited in any of the previous embodiments, wherein voltage is distributed to the electric vehicles based on an automatically-starting time schedule.

26. An apparatus as recited in any of the previous embodiments, wherein voltage is distributed to the electric vehicles based on manually-starting time schedule.

27. An apparatus as recited in any of the previous embodiments, wherein the one or more parameters comprise one or more of: a schedule of a user associated with an electric vehicle, power characteristics of the voltage source; status of a grid associated with the voltage source, pricing data associated with the voltage source, and charging characteristics of the electric vehicle.

28. An apparatus as recited in any of the previous embodiments, wherein the charging control module comprises: a voltage input; a plurality of voltage outputs each configured to individually couple to an electric vehicle; wherein the supplied voltage may be multiplexed over the plurality of voltage outputs.

29. A multiplexing charge control apparatus for electric vehicles, comprising: a charging control module; said charging module comprising an input configured to be coupled to a voltage source and a plurality of voltage outputs each configured to individually couple to an electric vehicle; wherein the supplied voltage may be multiplexed over the plurality of voltage outputs; said charging control module having a network connectable communications interface; and a remote server; said communications interface configured for communication between said server and said charging control module through a network gateway or other communications link; said communications interface configured for communication of charge control signals from said server to said charging control module for independently controlling distribution of power to said outputs; wherein said control signals are configured for multiplexing distribution of charging between a plurality of electric vehicles connected to said power outputs.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:
1. A system for multiplexing charging of electric vehicles, comprising:
 a server;
 said server remotely coupled to a charging control module over a wireless network for remotely controlling the charging control module over the wireless network;
 wherein said charging module comprises an input coupled to a voltage source;

wherein each charging control module is configured to regulate distribution of voltage from the voltage source to an electric vehicle coupled to the charging control module; and software executable on said server for:

a) identifying an electric vehicle coupled to the charging control module; and b) selectively distributing charging of the charging control module to multiplex distribution of voltage between the electric vehicle coupled to the charging control module and one or more other electric vehicles coupled to the server.

2. The system of claim 1, wherein selectively distributing charging further comprises:

generating a charging schedule based on one or more parameters; and distributing voltage to the electric vehicles according to the charging schedule.

3. The system of claim 2, wherein voltage is distributed to the electric vehicles simultaneously.

4. The system of claim 2, wherein voltage is distributed to the electric vehicles sequentially.

5. The system of claim 4, wherein voltage is distributed to the electric vehicles on a first-come, first-serve basis.

6. The system of claim 4, wherein voltage is distributed to the electric vehicles on a round-robin basis.

7. The system of claim 4, wherein voltage is distributed to the electric vehicles based on an established priority between the electric vehicles.

8. The system of claim 7, wherein voltage is distributed to the electric vehicles as a function of an established priority between the electric vehicles and an energy pricing threshold associated with an electric vehicle.

9. The system of claim 4, wherein voltage is distributed to the electric vehicles based on an automatically-starting time schedule.

10. The system of claim 4, wherein voltage is distributed to the electric vehicles based on manually-starting time schedule.

11. The system of claim 2, wherein the one or more parameters comprise one or more of: a schedule of a user associated with an electric vehicle, power characteristics of the voltage source; status of a grid associated with the voltage source, pricing data associated with the voltage source, and charging characteristics of the electric vehicle.

12. The system of claim 1, wherein the charging control modules comprise:

a voltage input;

a plurality of voltage outputs each configured to individually couple to an electric vehicle; and wherein the supplied voltage may be multiplexed over the plurality of voltage outputs.

13. The system of claim 2, wherein the charging control module comprises:

a sensor, said sensor configured for sensing a characteristic of the supplied voltage;

wherein the charging control module is configured to upload data relating to said characteristic to said server.

14. The system of claim 13, wherein the characteristic comprises one or more of: current, voltage, frequency, and power quality of the supplied voltage.

15. The system of claim 1, wherein the server communicates with the plurality of charging control modules over a wireless network.

16. A multiplexing charge control apparatus for electric vehicles, comprising:

a charging control module;

said charging module comprising an input configured to be coupled to a voltage source and at least one power output configured to be coupled to an electric vehicle;

said charging control module having a network connectable communications interface; and a remote server for remotely controlling the charging control module;

said communications interface configured for communication between said server and said charging control module through a network gateway or other wireless communications link;

said communications interface configured for communication of charge control signals from said server to said charging control module for independently controlling distribution of power to said at least one output;

wherein said control signals are configured for multiplexing distribution of charging the electric vehicle connected to said power output and a second electric vehicle coupled to the remote server.

17. The multiplexing charge control apparatus of claim 16, further comprising software executable on said server for:

identifying an electric vehicle coupled to the charging control module; and selectively distributing charging of the charging control module to multiplex distribution of voltage between the electric vehicle coupled to the charging control module and the second electric vehicle.

18. The multiplexing charge control apparatus of claim 17, wherein selectively distributing charging further comprises:

generating a charging schedule based on one or more parameters; and distributing voltage to the electric vehicles according to the charging schedule.

19. The multiplexing charge control apparatus of claim 18, wherein voltage is distributed to the electric vehicles simultaneously.

20. The multiplexing charge control apparatus of claim 18, wherein voltage is distributed to the electric vehicles sequentially.

21. The multiplexing charge control apparatus of claim 20, wherein voltage is distributed to the electric vehicles on a first-come, first-serve basis.

22. The multiplexing charge control apparatus of claim 20, wherein voltage is distributed to the electric vehicles on a round-robin basis.

23. The multiplexing charge control apparatus of claim 20, wherein voltage is distributed to the electric vehicles based on an established priority between the electric vehicles.

24. The multiplexing charge control apparatus of claim 23, wherein voltage is distributed to the electric vehicles as a function of an established priority between the electric vehicles and an energy pricing threshold associated with an electric vehicle.

25. The multiplexing charge control apparatus of claim 20, wherein voltage is distributed to the electric vehicles based on an automatically-starting time schedule.

26. The multiplexing charge control apparatus of claim 20, wherein voltage is distributed to the electric vehicles based on manually-starting time schedule.

27. The multiplexing charge control apparatus of claim 18, wherein the one or more parameters comprise one or more of: a schedule of a user associated with an electric vehicle, power characteristics of the voltage source; status of a grid associated with the voltage source, pricing data associated with the voltage source, and charging characteristics of the electric vehicle.

28. The multiplexing charge control apparatus of claim 16, wherein the charging control module comprises:
   a voltage input;
   a plurality of voltage outputs each configured to individually couple to an electric vehicle;
   wherein the supplied voltage may be multiplexed over the plurality of voltage outputs.

29. A multiplexing charge control apparatus for electric vehicles, comprising:
   a charging control module;
   said charging module comprising an input configured to be coupled to a voltage source and a plurality of voltage outputs each configured to individually couple to an electric vehicle;
   wherein the supplied voltage may be multiplexed over the plurality of voltage outputs;
   said charging control module having a network connectable communications interface; and
   a remote server;
   said communications interface configured for communication between said server and said charging control module for remotely controlling the charging control module through a network gateway or other wireless communications link;
   said communications interface configured for communication of charge control signals from said server to said charging control module for independently controlling distribution of power to said outputs;
   wherein said control signals are configured for multiplexing distribution of charging between a plurality of electric vehicles connected to said power outputs.

* * * * *